US011465344B2

(12) United States Patent
Wilenski et al.

(10) Patent No.: US 11,465,344 B2
(45) Date of Patent: Oct. 11, 2022

(54) METHODS FOR ADDITIVE MANUFACTURING

(71) Applicant: The Boeing Company, Chicago, IL (US)

(72) Inventors: Mark Stewart Wilenski, Mercer Island, WA (US); Faraón Torres, Everett, WA (US); Samuel F. Harrison, Bothell, WA (US); Nick Shadbeh Evans, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 16/918,902

(22) Filed: Jul. 1, 2020

(65) Prior Publication Data

US 2020/0331256 A1    Oct. 22, 2020

Related U.S. Application Data

(62) Division of application No. 15/610,466, filed on May 31, 2017, now Pat. No. 10,759,159.

(51) Int. Cl.
*B33Y 10/00* (2015.01)
*B33Y 30/00* (2015.01)
(Continued)

(52) U.S. Cl.
CPC ............ *B29C 64/20* (2017.08); *B29C 64/106* (2017.08); *B29C 70/06* (2013.01); *B29C 70/38* (2013.01);
(Continued)

(58) Field of Classification Search
None
See application file for complete search history.

(56) References Cited

U.S. PATENT DOCUMENTS

| 3,600,272 A | 8/1971 | Cortigene et al. |
| 3,813,976 A | 6/1974 | Greer |
| (Continued) | | |

FOREIGN PATENT DOCUMENTS

| CN | 103817937 | 5/2014 |
| DE | 102008022592 | 11/2009 |
| (Continued) | | |

OTHER PUBLICATIONS

Website screenshots showing Stratonics ThermaViz® Sensor Systems, from Stratonics.com website, downloaded on Nov. 4, 2016.
(Continued)

*Primary Examiner* — Joseph S Del Sole
*Assistant Examiner* — Guy F Mongelli
(74) *Attorney, Agent, or Firm* — Dascenzo Gates Intellectual Property Law, P.C.

(57) ABSTRACT

A method of additively manufacturing an object comprises feeding a feedstock line into a delivery guide. The feedstock line has a length and comprises a continuous flexible line. The continuous flexible line has a peripheral surface. The feedstock line further comprises a covering, releasably coupled to the peripheral surface of the continuous flexible line. The method also comprises removing the covering from the peripheral surface of the continuous flexible line before the continuous flexible line is deposited along a print path and depositing the continuous flexible line along the print path using the delivery guide.

20 Claims, 13 Drawing Sheets

(51) Int. Cl.
| | |
|---|---|
| B29C 64/20 | (2017.01) |
| B29C 70/38 | (2006.01) |
| B29C 64/106 | (2017.01) |
| B29C 70/06 | (2006.01) |
| B33Y 70/00 | (2020.01) |
| B29C 64/209 | (2017.01) |
| B29C 64/141 | (2017.01) |
| H02G 3/04 | (2006.01) |

(52) U.S. Cl.
CPC .............. *B33Y 10/00* (2014.12); *B33Y 30/00* (2014.12); *B33Y 70/00* (2014.12); *B29C 64/141* (2017.08); *B29C 64/209* (2017.08); *H02G 3/0462* (2013.01)

(56) References Cited

U.S. PATENT DOCUMENTS

| | | |
|---|---|---|
| 4,154,634 A | 5/1979 | Shobert et al. |
| 4,378,343 A | 3/1983 | Sugiura et al. |
| 4,435,246 A | 3/1984 | Green |
| 4,531,992 A | 7/1985 | Eaton |
| 4,943,472 A | 7/1990 | Dyksterhouse et al. |
| 5,204,124 A | 4/1993 | Secretan et al. |
| 5,294,461 A | 3/1994 | Ishida |
| 5,340,433 A | 8/1994 | Crump |
| 5,398,193 A | 3/1995 | deAngelis |
| 5,495,328 A | 2/1996 | Spence et al. |
| 5,936,861 A | 8/1999 | Jang et al. |
| 6,129,872 A | 10/2000 | Jang |
| 6,149,856 A | 11/2000 | Zemel et al. |
| 6,214,279 B1 | 4/2001 | Yang et al. |
| 6,362,388 B1 | 3/2002 | Lucas |
| 6,395,210 B1 | 5/2002 | Head et al. |
| 6,722,872 B1 | 4/2004 | Swanson et al. |
| 6,899,777 B2 | 5/2005 | Vaidyanathan et al. |
| 7,114,943 B1 | 10/2006 | Fong et al. |
| 7,681,615 B2 | 3/2010 | McCowin |
| 7,744,801 B2 | 6/2010 | Owada |
| 7,879,177 B2 | 2/2011 | McCowin et al. |
| 7,891,964 B2 | 2/2011 | Skubic et al. |
| 7,942,987 B2 | 5/2011 | Crump et al. |
| 7,960,024 B2 | 6/2011 | Nair et al. |
| 8,110,135 B2 | 2/2012 | El-Siblani |
| 8,133,537 B2 | 3/2012 | Nair et al. |
| 8,151,854 B2 | 4/2012 | Oldani |
| 8,691,037 B2 | 4/2014 | Ingram, Jr. et al. |
| 8,801,990 B2 | 8/2014 | Mikulak et al. |
| 8,920,697 B2 | 12/2014 | Mikulak et al. |
| 9,102,098 B2 | 8/2015 | Dilworth et al. |
| 9,102,099 B1 | 8/2015 | Karpas et al. |
| 9,126,367 B1 | 9/2015 | Mark et al. |
| 9,132,587 B2 | 9/2015 | Eshed et al. |
| 9,138,940 B2 | 9/2015 | Post et al. |
| 9,149,988 B2 | 10/2015 | Mark et al. |
| 9,149,989 B2 | 10/2015 | Uckelmann |
| 9,186,848 B2 | 11/2015 | Mark et al. |
| 9,527,240 B2 | 12/2016 | Batchelder |
| 9,571,543 B2 | 2/2017 | Zhang |
| 9,577,224 B2 | 2/2017 | Lee et al. |
| 9,586,298 B2 | 3/2017 | Jones et al. |
| 9,623,437 B2 | 4/2017 | Tibor et al. |
| 9,650,537 B2 | 5/2017 | Kunc et al. |
| 9,694,544 B2 | 7/2017 | Mark et al. |
| 9,751,260 B2 | 9/2017 | Dietrich et al. |
| 9,770,876 B2 | 9/2017 | Farmer et al. |
| 9,789,462 B2 | 10/2017 | Singh |
| 9,849,019 B2 | 12/2017 | Miller et al. |
| 9,902,588 B2 | 2/2018 | Mannella et al. |
| 9,908,145 B2 | 3/2018 | Farmer et al. |
| 10,016,932 B2 | 7/2018 | Moore et al. |
| 10,016,942 B2 | 7/2018 | Mark et al. |
| 10,076,875 B2 | 9/2018 | Mark et al. |
| 10,099,427 B2 | 10/2018 | Mark et al. |
| 10,137,500 B2 | 11/2018 | Blackmore |
| 10,155,345 B2 | 12/2018 | Ermoshkin et al. |
| 10,195,784 B2 | 2/2019 | Evans et al. |
| 10,201,941 B2 | 2/2019 | Evans et al. |
| 10,232,550 B2 | 3/2019 | Evans et al. |
| 10,232,570 B2 | 3/2019 | Evans et al. |
| 10,293,591 B2 | 5/2019 | Nielsen-Cole et al. |
| 10,335,856 B2 | 7/2019 | Swaminathan et al. |
| 10,343,330 B2 | 7/2019 | Evans et al. |
| 10,343,355 B2 | 7/2019 | Evans et al. |
| 10,457,033 B2 | 10/2019 | Wilenski et al. |
| 10,668,533 B2 | 6/2020 | Ng et al. |
| 2004/0119188 A1 | 6/2004 | Lowe |
| 2005/0023719 A1 | 2/2005 | Nielsen et al. |
| 2005/0038222 A1 | 2/2005 | Joshi et al. |
| 2005/0104241 A1 | 5/2005 | Kritchman et al. |
| 2005/0116391 A1 | 6/2005 | Lindemann et al. |
| 2008/0315462 A1 | 12/2008 | Batzinger et al. |
| 2011/0300301 A1 | 12/2011 | Fernando et al. |
| 2014/0134335 A1* | 5/2014 | Pridoehl ............ B33Y 30/00 427/256 |
| 2014/0265000 A1 | 9/2014 | Magnotta et al. |
| 2014/0291886 A1 | 10/2014 | Mark et al. |
| 2015/0174824 A1 | 6/2015 | Gifford et al. |
| 2016/0159009 A1 | 6/2016 | Canale |
| 2017/0129180 A1 | 5/2017 | Coates et al. |
| 2017/0341307 A1 | 11/2017 | Vilajosana et al. |
| 2018/0126671 A1 | 5/2018 | Wilenski et al. |
| 2018/0141284 A1 | 5/2018 | Wilenski et al. |
| 2018/0154588 A1 | 6/2018 | Wilenski et al. |
| 2020/0016882 A1 | 1/2020 | Wilenski et al. |

FOREIGN PATENT DOCUMENTS

| | | | |
|---|---|---|---|
| DE | 201310103973 | | 10/2014 |
| DE | 102015002967 | | 10/2016 |
| EP | 0188822 | * | 7/1986 |
| EP | 1151849 | | 11/2001 |
| EP | 1494248 | | 1/2005 |
| JP | 11-262657 | | 9/1999 |
| JP | 2015174284 | | 10/2015 |
| WO | WO 2006020685 | | 2/2006 |
| WO | WO 2012039956 | | 3/2012 |
| WO | WO 2013086577 | | 6/2013 |
| WO | 2013158305 A | | 10/2013 |
| WO | WO 2014153535 | | 9/2014 |
| WO | WO 2015009938 | | 1/2015 |
| WO | WO 2015193819 | | 12/2015 |
| WO | WO 2016053681 | | 4/2016 |
| WO | WO 2016125138 | | 8/2016 |
| WO | WO 2016139059 | | 9/2016 |
| WO | WO 2016149181 | | 9/2016 |

OTHER PUBLICATIONS

Printout of online article, "Improving Additive Manufacturing (3D Printing) using Infrared Imaging," Aug. 10, 2016, from AZoM.com website, downloaded on Nov. 4, 2016.

Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.

Printout of online article, Jeff Sloan, "Arevo Labs launches 3D printing platform for composite parts fabrication," Nov. 16, 2015, from CompositesWorld.com website, downloaded on Dec. 9, 2015.

Website screenshots of online how-to article, "Fiber Composite 3D Printing (The Bug)," from Instructables.com website, downloaded on Aug. 20, 2015.

Printout of website showing FormLabs, Frequently Asked Questions (re the Form1+ SLA 3D Printer), from FormLabs.com website, downloaded on Aug. 19, 2015.

Website screenshots showing The Form 1+ SLA 3D Printer, from FormLabs.com website, downloaded on Aug. 20, 2015.

Printout of online article "Carbon3D Introduces Breakthrough CLIP Technology for Layerless 3D Printing, 25-100x Faster," Mar. 17, 2015, from 3Ders.org website, downloaded on Aug. 19, 2015.

(56) References Cited

OTHER PUBLICATIONS

Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing The Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website, downloaded on Aug. 19, 2015.
User Manual for 3Doodler 2.0, from The3Doodler.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.
Machine generated English translation of abstract for DE 201310103973 downloaded from Espacenet.com on Nov. 1, 2017.
Machine generated English translation of CN 103817937, dated Mar. 26, 2018.
Machine generated English translation of the abstract of JP 2015174284, downloaded from Espacenet.com Jun. 12, 2018.
Machine generated English translation of the abstract of DE 102015002967, downloaded from Espacenet.com Jun. 12, 2018.
European Patent Office, Partial European Search Report for related European Patent Application No. 18166825 dated Oct. 22, 2018.
Machine-generated English abstract of EP 1494248, downloaded from Espacenet.com on Nov. 21, 2018.
Machine-generated English translation of DE 102008022592, downloaded from Espacenet.com on Nov. 21, 2018.
English language machine translation of Japanese Patent Application Publication No. 11-262657, Sep. 28, 1999.
Japanese Patent Office, Japanese Office action for related Japanese Application No. 2018-095331, dated Jan. 11, 2022.
English translation of Japanese Patent Office, Japanese Office action for related Japanese Application No. 2018-095331, dated Jan. 11, 2022.
European Patent Office, Extended European Search Report for related European patent application EP 20 168 261, dated Aug. 24, 2022.

* cited by examiner

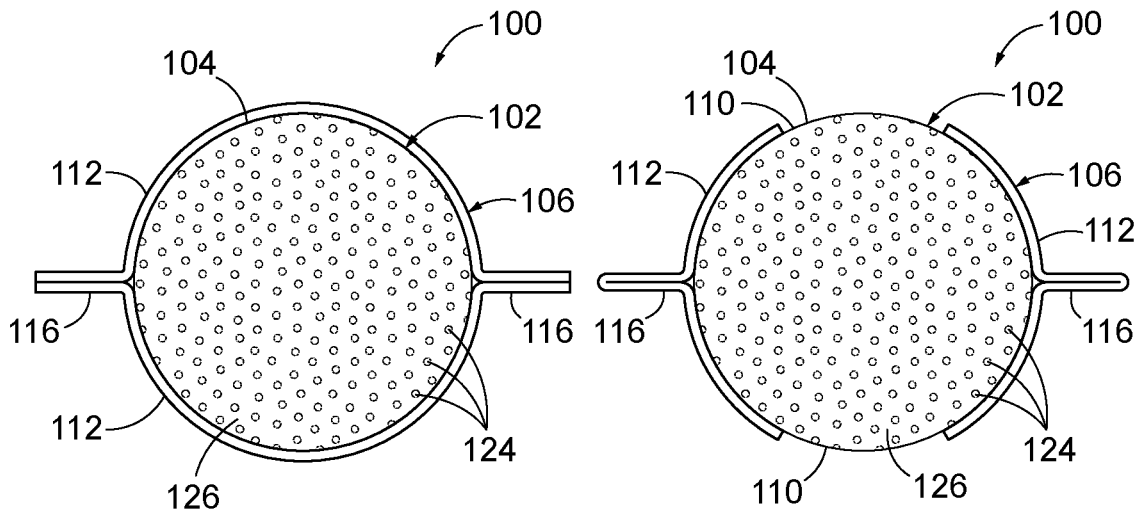
FIG. 11     FIG. 12
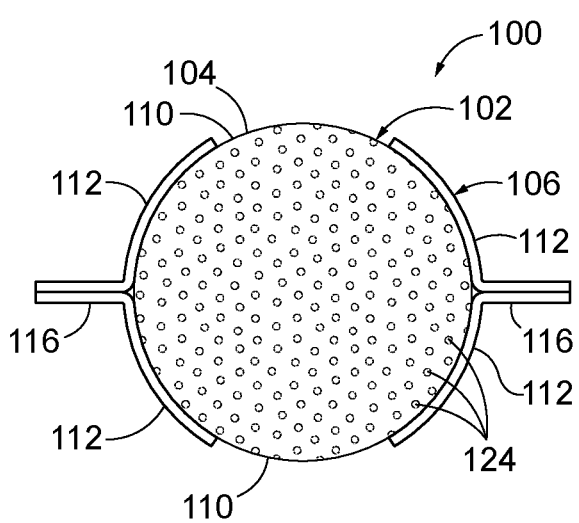 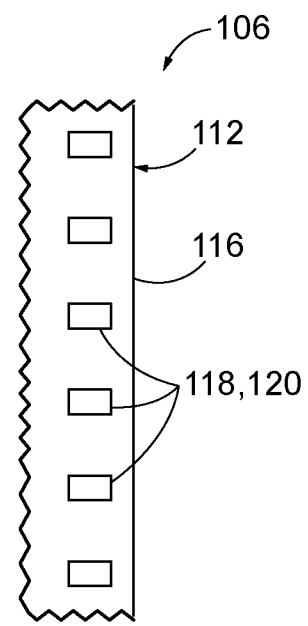
FIG. 13     FIG. 14

METHODS FOR ADDITIVE MANUFACTURING

RELATED APPLICATION

This application is a divisional of and claims priority to U.S. patent application Ser. No. 15/610,466, filed on May 31, 2017, entitled "FEEDSTOCK LINES, SYSTEMS, AND METHODS FOR ADDITIVE MANUFACTURING," which issued Sep. 1, 2020 as U.S. Pat. No. 10,759,159, the complete disclosure of which is incorporated herein by reference.

FIELD

The present disclosure relates to additive manufacturing.

BACKGROUND

An additive manufacturing process may include dispensing or extruding a feedstock material from a print head, or nozzle, that moves in three dimensions under computer control to manufacture a part. Depending on the properties of the feedstock material, its advancement through the print head may be difficult or result in undesirable effects. For example, when the feedstock material is or includes a glutinous material, the feedstock material may gum-up, clog, or otherwise foul the print head. As another example, when the feedstock material includes elongate carbon or other fibers, the fibers may kink, break, or otherwise buckle and become damaged or clog the print head. As yet another example, when the feedstock material is or includes an uncured or partially cured, curable resin, the resin may undesirably gradually cure inside the print head to progressively clog the print head and partially or completely obstruct the operative advancement of the feedstock material through the print head.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a feedstock line for additively manufacturing an object. The feedstock line has a length and comprises a continuous flexible line. The continuous flexible line has a peripheral surface. The feedstock line also comprises a covering. The covering is releasably coupled to the peripheral surface of the continuous flexible line.

The covering, when coupled to the peripheral surface, facilitates the handling of the feedstock line, such as by an associated additive manufacturing system that utilizes the continuous flexible line for additively manufacturing the object. For example, the continuous flexible line, in some examples, may be uncured or only partially cured when part of the feedstock line, and thus may be tacky, sticky, or otherwise difficult to handle by a user of an associated additive manufacturing system without damage to the continuous flexible line or without soiling of the associated additive manufacturing system or a user thereof. In addition, the covering may provide a sufficient rigidity to the feedstock line, such that an associated additive manufacturing system may more easily handle the feedstock line when compared to the continuous flexible line by itself. Moreover, by being removably coupled to the peripheral surface of the continuous flexible line, the covering may be easily removed from the continuous flexible line, such as by an associated additive manufacturing system, for additively manufacturing the object with the continuous flexible line.

Additionally, in some examples, the covering protects the continuous flexible line from undesirable or premature exposure to the surrounding environment. For example, in some examples, the continuous flexible line may be at least partially constructed of a material that is configured to cure responsive to exposure to electromagnetic radiation or ambient air. In such examples, the covering may shield the continuous flexible line from such exposure. Moreover, the feedstock line therefore may be more easily stored and transported, as well as utilized by an associated additive manufacturing system, without the need to separately, or expensively, shield the feedstock line from environmental exposure.

Another example of the subject matter according to the invention relates to a system for additively manufacturing an object by depositing a continuous flexible line along a print path. The system comprises a delivery guide. The delivery guide is configured to receive a feedstock line. The feedstock line has a length and comprises the continuous flexible line. The continuous flexible line has a peripheral surface. The feedstock line further comprises a covering, releasably coupled to the peripheral surface of the continuous flexible line. The delivery guide is also configured to deposit the continuous flexible line along the print path. The system also comprises a covering-removal mechanism, configured to remove the covering from the peripheral surface of the continuous flexible line before the continuous flexible line is deposited along the print path by the delivery guide.

The system therefore may be used to manufacture the object from the continuous flexible line. Because the covering is releasably coupled to the peripheral surface, the feedstock line may be handled by the system without the continuous flexible line undesirably coming into direct contact with component parts of the system. Moreover, the covering provides a sufficient rigidity to the feedstock line so that the feedstock line may be advanced through the system, including into and through the delivery guide. For example, the continuous flexible line, in some examples, may be uncured or only partially cured when part of the feedstock line, and thus may be tacky, sticky, limp, soft, flexible, or otherwise difficult to handle by a user of the system without damage to the continuous flexible line or without soiling of the system or a user thereof. Moreover, by being removably coupled to the peripheral surface of the continuous flexible line, the covering may be easily removed from the continuous flexible line by the covering-removal mechanism for additively manufacturing the object with the continuous flexible line.

Additionally, in some examples, the covering protects the continuous flexible line from undesirable or premature exposure to the surrounding environment. For example, in some examples, the continuous flexible line may be at least partially constructed of a material that is configured to cure responsive to exposure to electromagnetic radiation or ambient air. In such examples, the covering may shield the continuous flexible line from such exposure, until such time that the covering-removal mechanism operably removes the covering from the peripheral surface of the continuous flexible line. Moreover, the feedstock line therefore may be more easily stored and transported, as well as utilized by the system, without the need to separately, or expensively, shield the feedstock line from environmental exposure.

Yet another example of the subject matter according to the invention relates to a method of additively manufacturing an object. The method comprises feeding a feedstock line into a delivery guide. The feedstock line has a length and comprises a continuous flexible line. The continuous flexible line has a peripheral surface. The feedstock line further comprises a covering, releasably coupled to the peripheral surface of the continuous flexible line. The method also comprises removing the covering from the peripheral surface of the continuous flexible line before the continuous flexible line is deposited along a print path and depositing the continuous flexible line along the print path using the delivery guide.

The method therefore may be implemented to manufacture the object from the continuous flexible line. Because the covering is releasably coupled to the peripheral surface, the feedstock line may be handled, such as by an associated manufacturing system or user thereof, prior to the covering being removed from the continuous flexible line. Moreover, the covering provides a sufficient rigidity to the feedstock line so that the feedstock line may be fed into and advanced through the delivery guide. For example, the continuous flexible line, in some examples, may be uncured or only partially cured when part of the feedstock line, and thus may be tacky, sticky, limp, soft, flexible, or otherwise difficult to handle by a user of an associated additive manufacturing system without damage to the continuous flexible line or without soiling of the associated additive manufacturing system or a user thereof.

Additionally, in some examples, the covering protects the continuous flexible line from undesirable or premature exposure to the surrounding environment. For example, in some examples, the continuous flexible line may be at least partially constructed of a material that is configured to cure responsive to exposure to electromagnetic radiation or ambient air. In such examples, the covering may shield the continuous flexible line from such exposure, until such time that the covering is removed from the peripheral surface of the continuous flexible line.

BRIEF DESCRIPTION OF THE DRAWINGS

Figure 1:
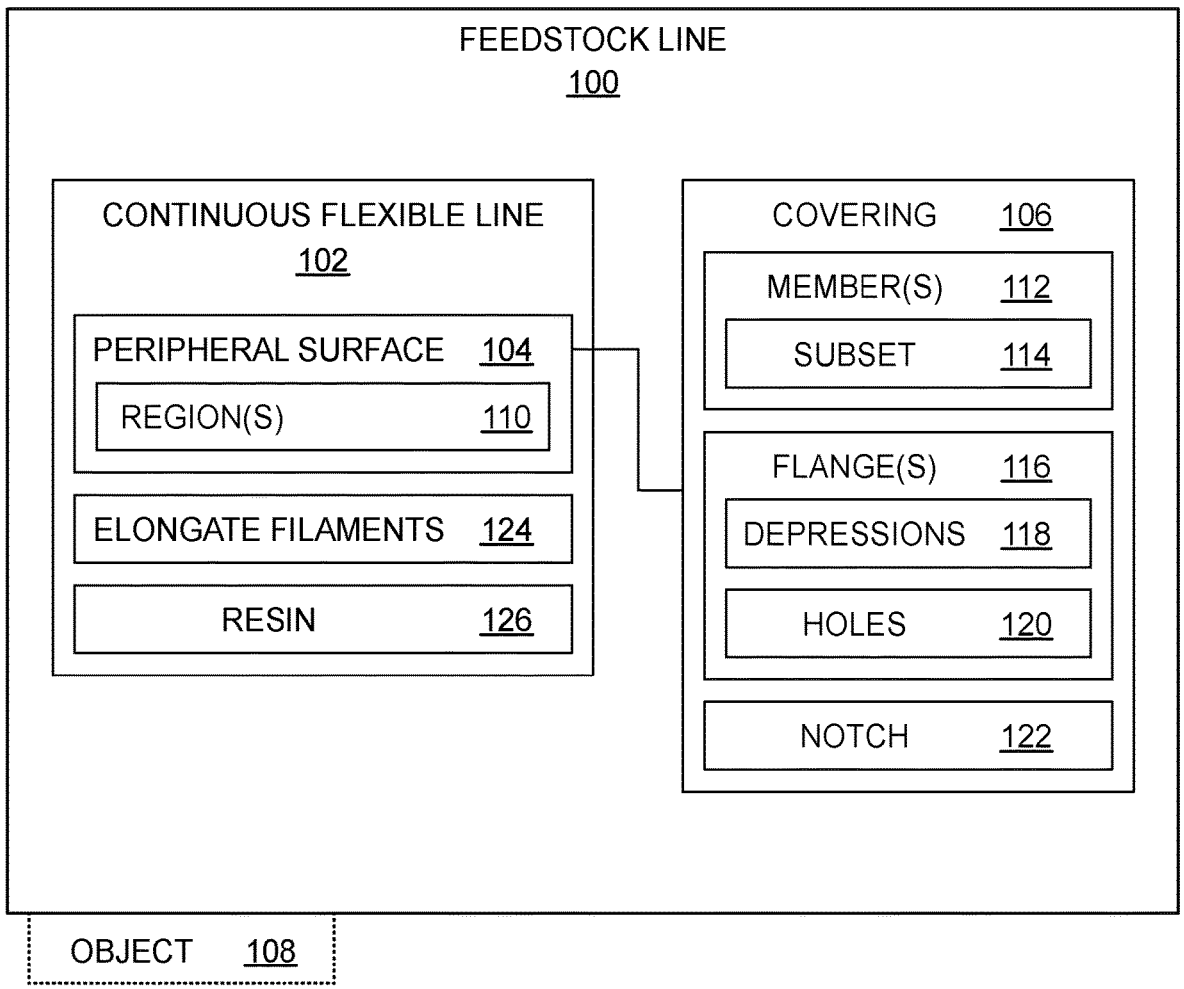
Figure 2:
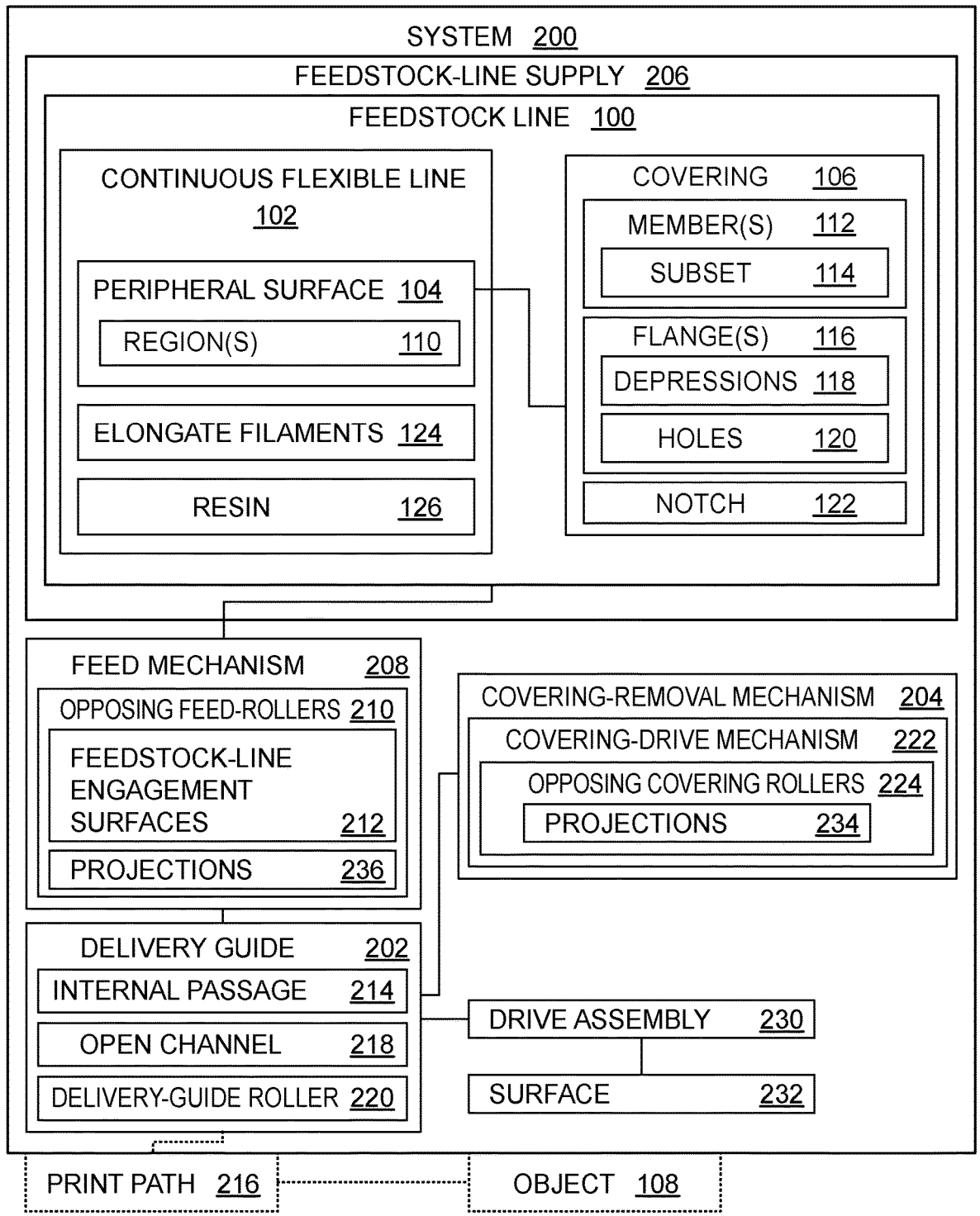
Figure 3:
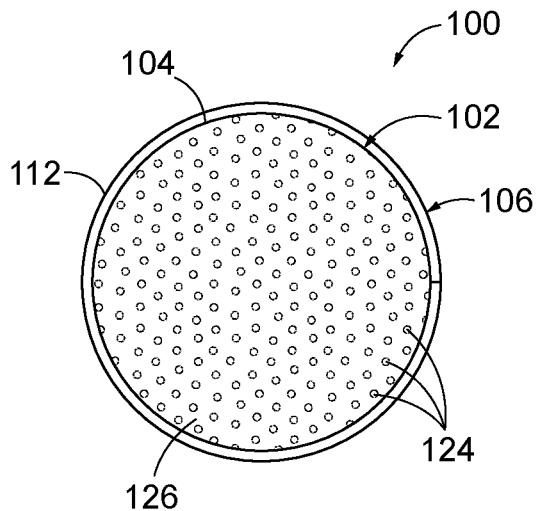
Figure 4:
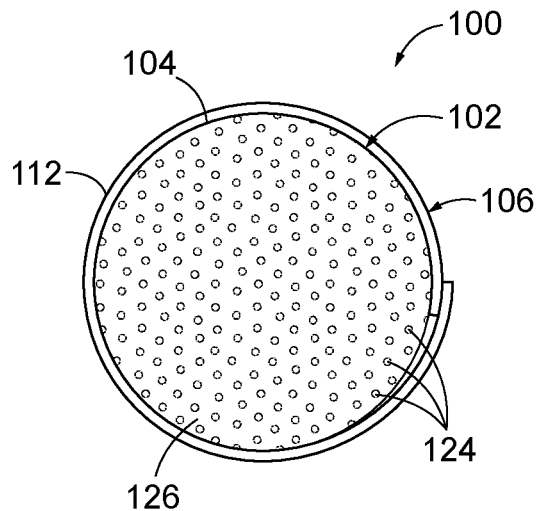
Figure 5:
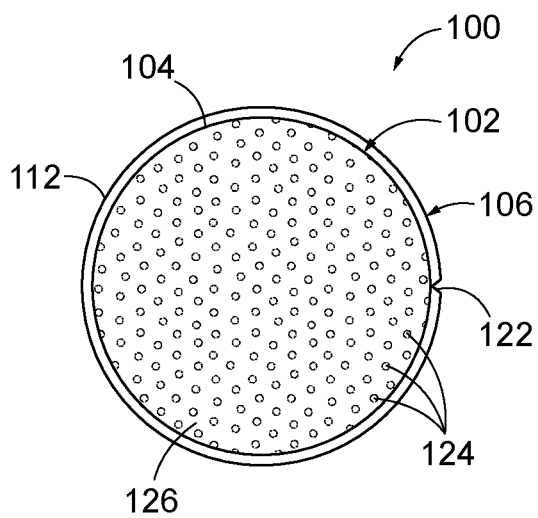
Figure 6:
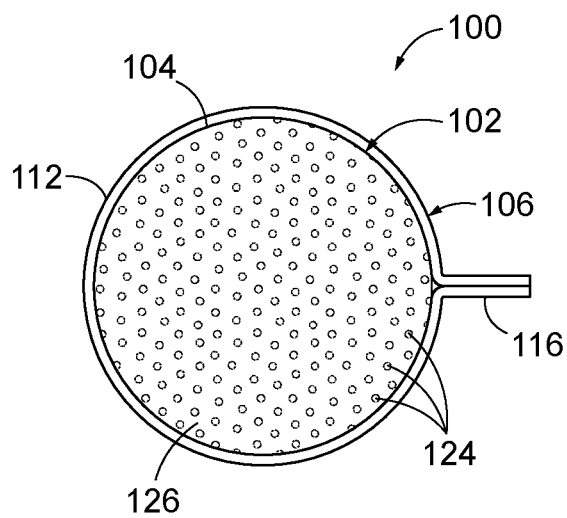
Figures 7, 8:
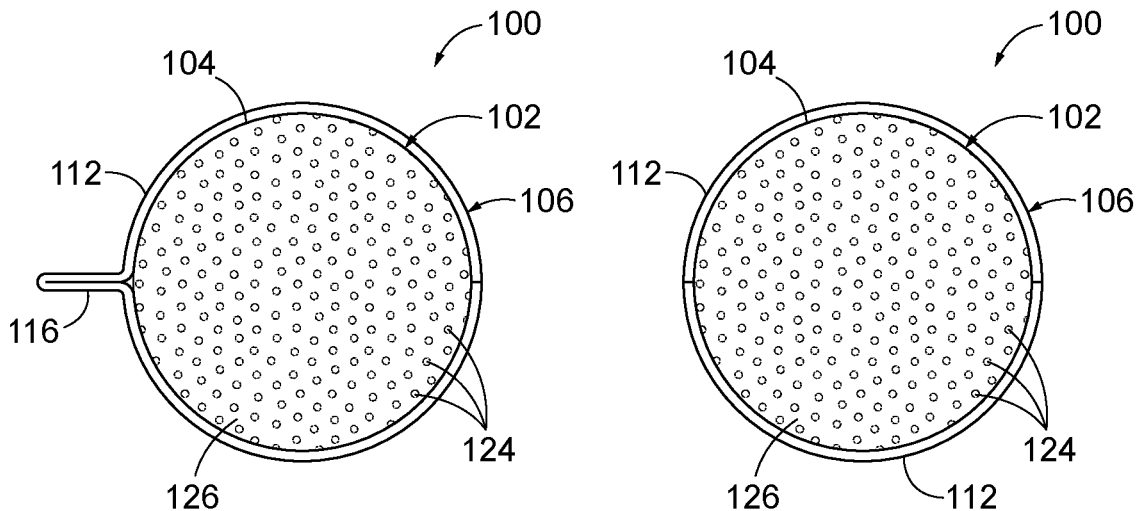
Figures 9, 10:
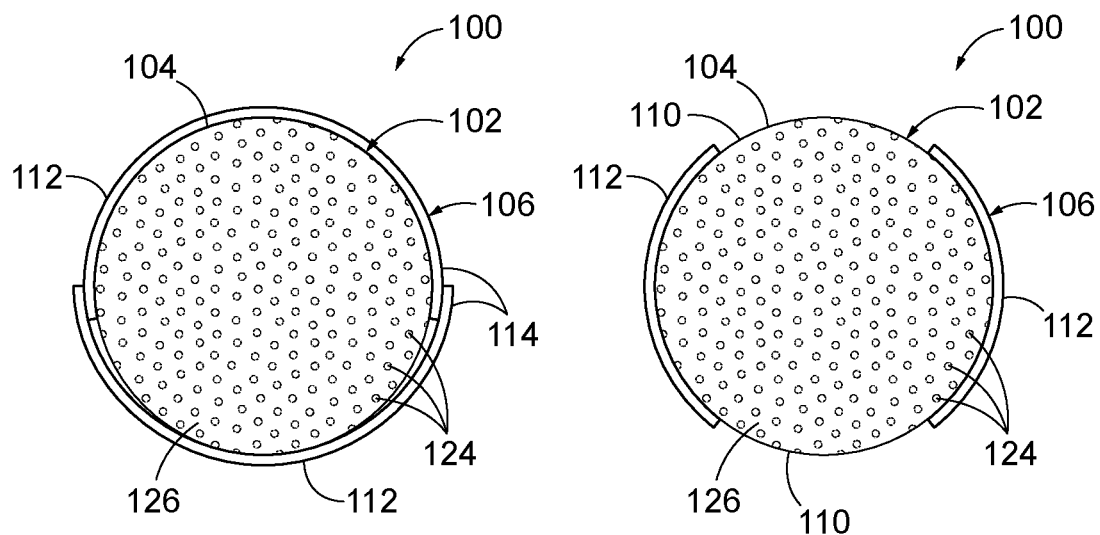
Figure 15:
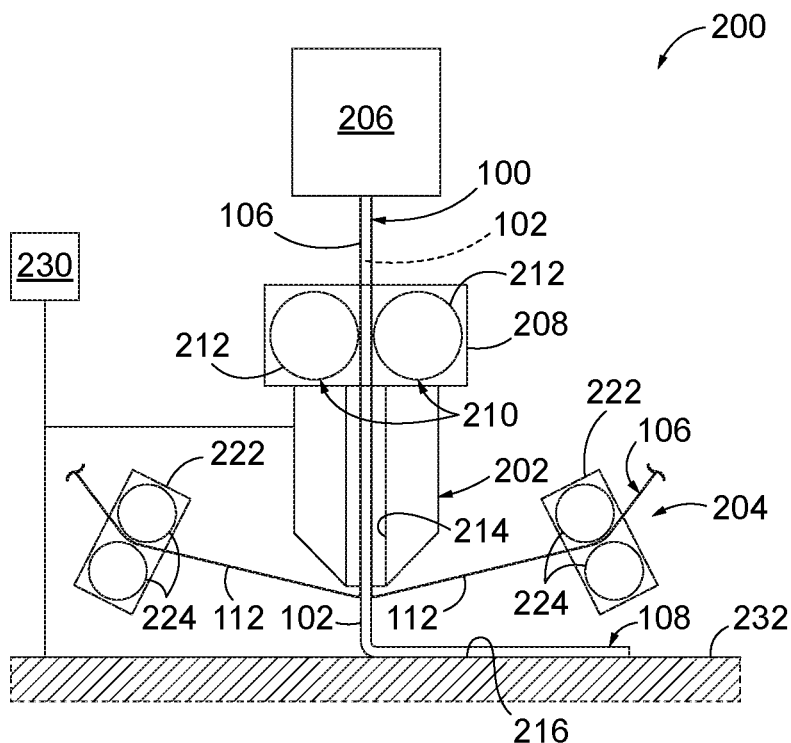
Figure 16:
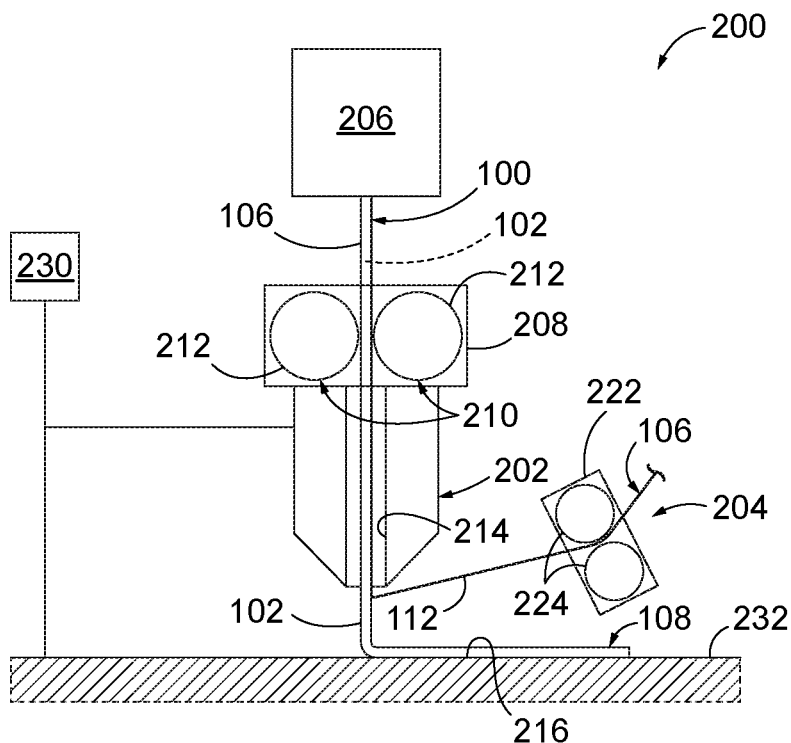
Figure 17:
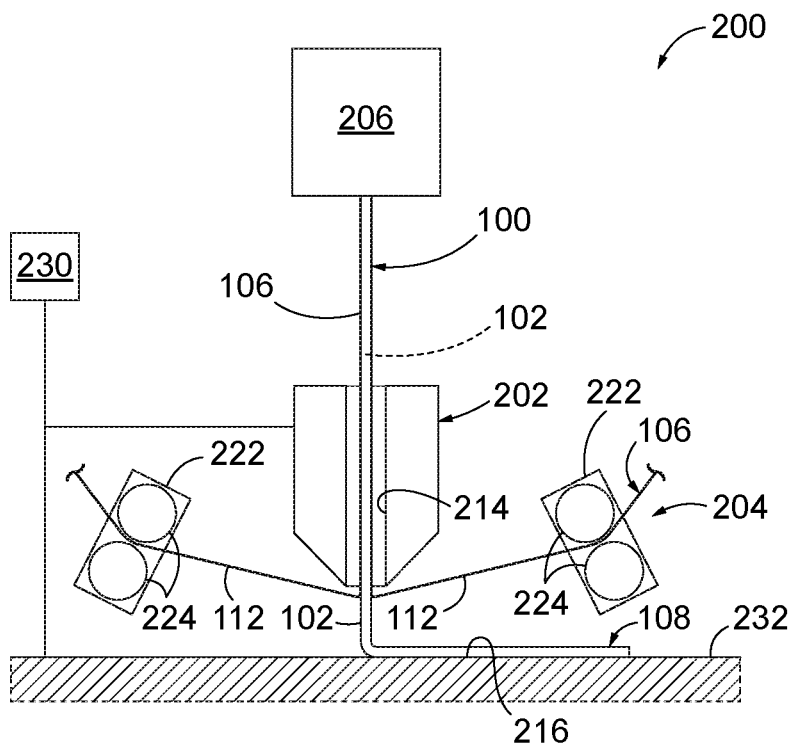
Figure 18:
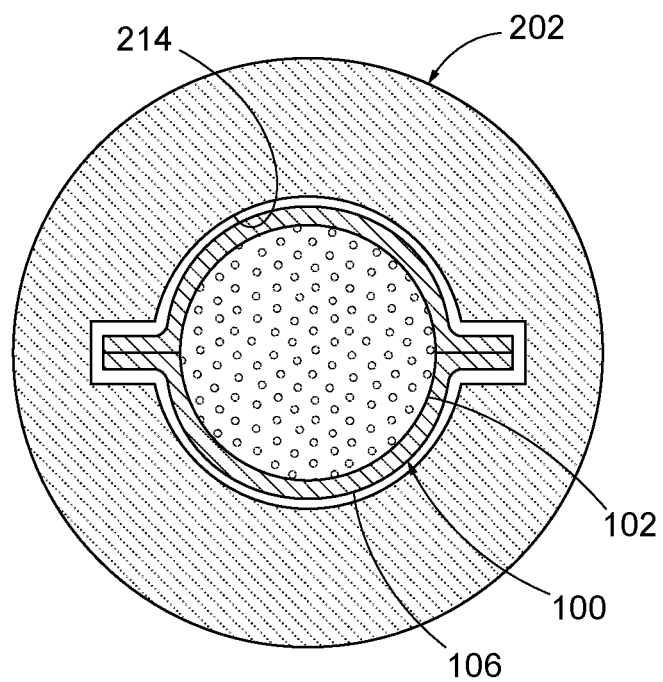
Figures 19, 20:
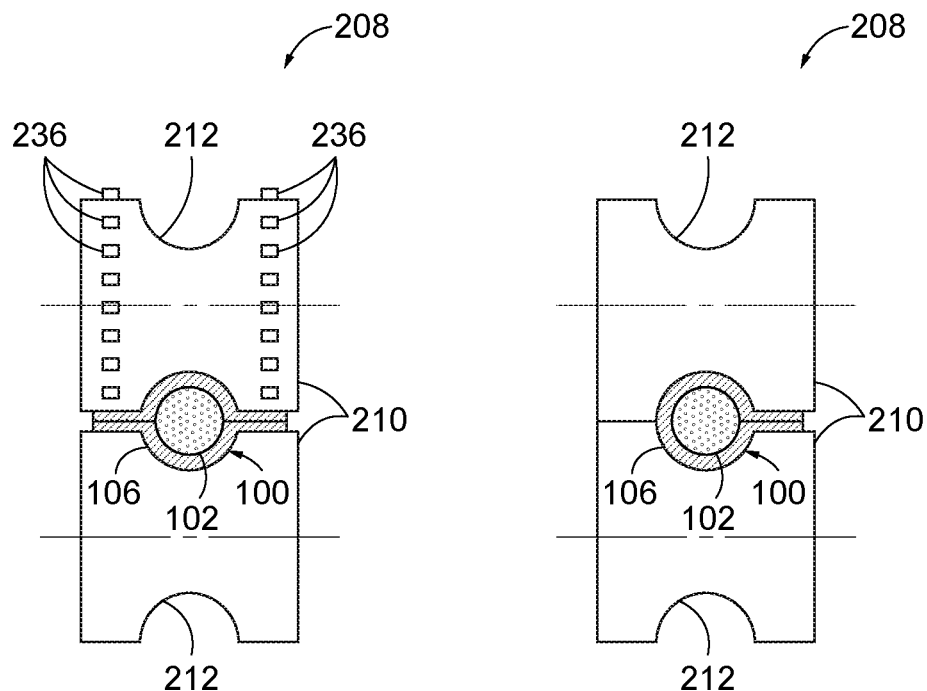
Figure 21:
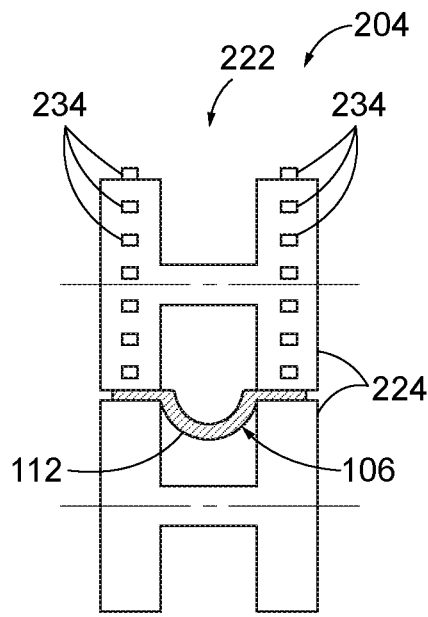
Figure 22:
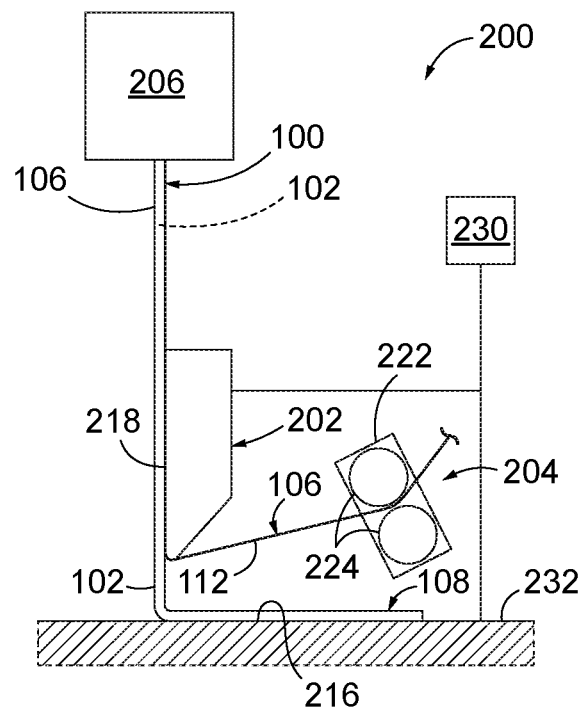
Figure 23:
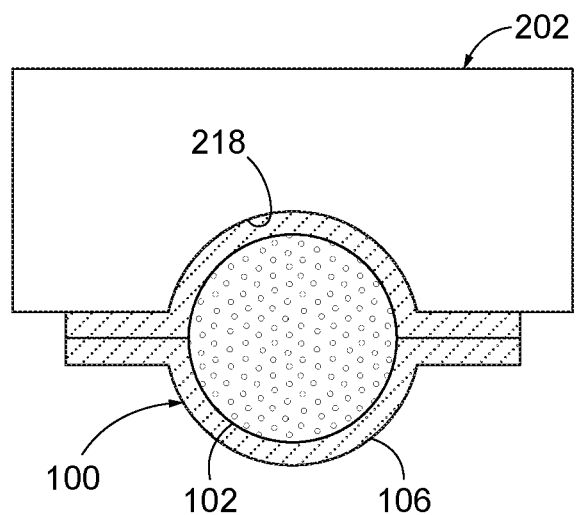
Figure 24:
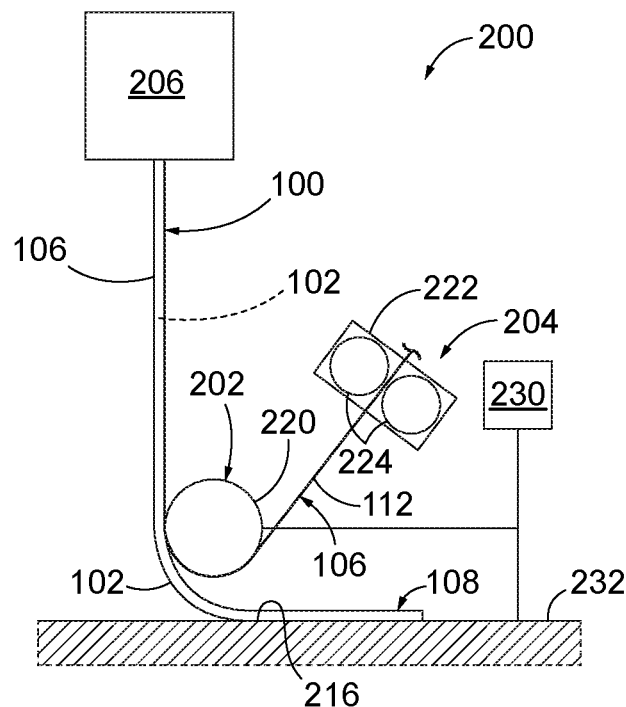
Figure 25:
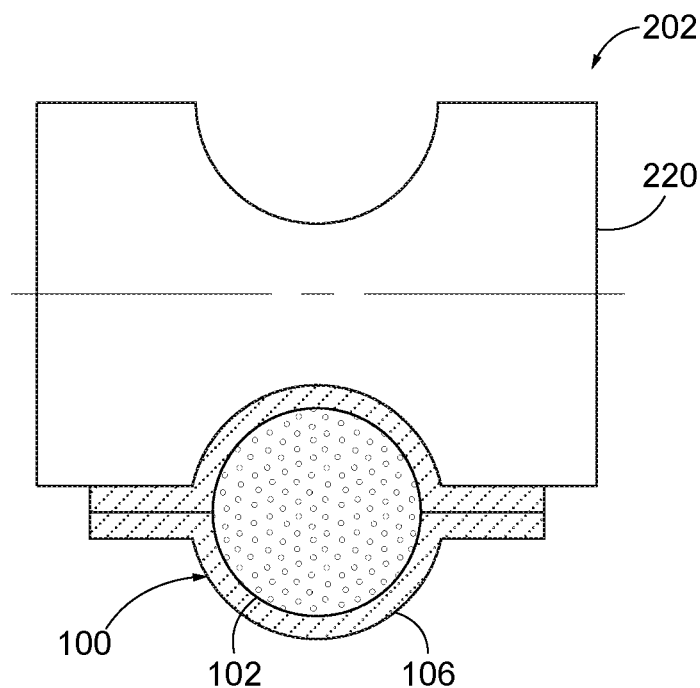
Figure 26:
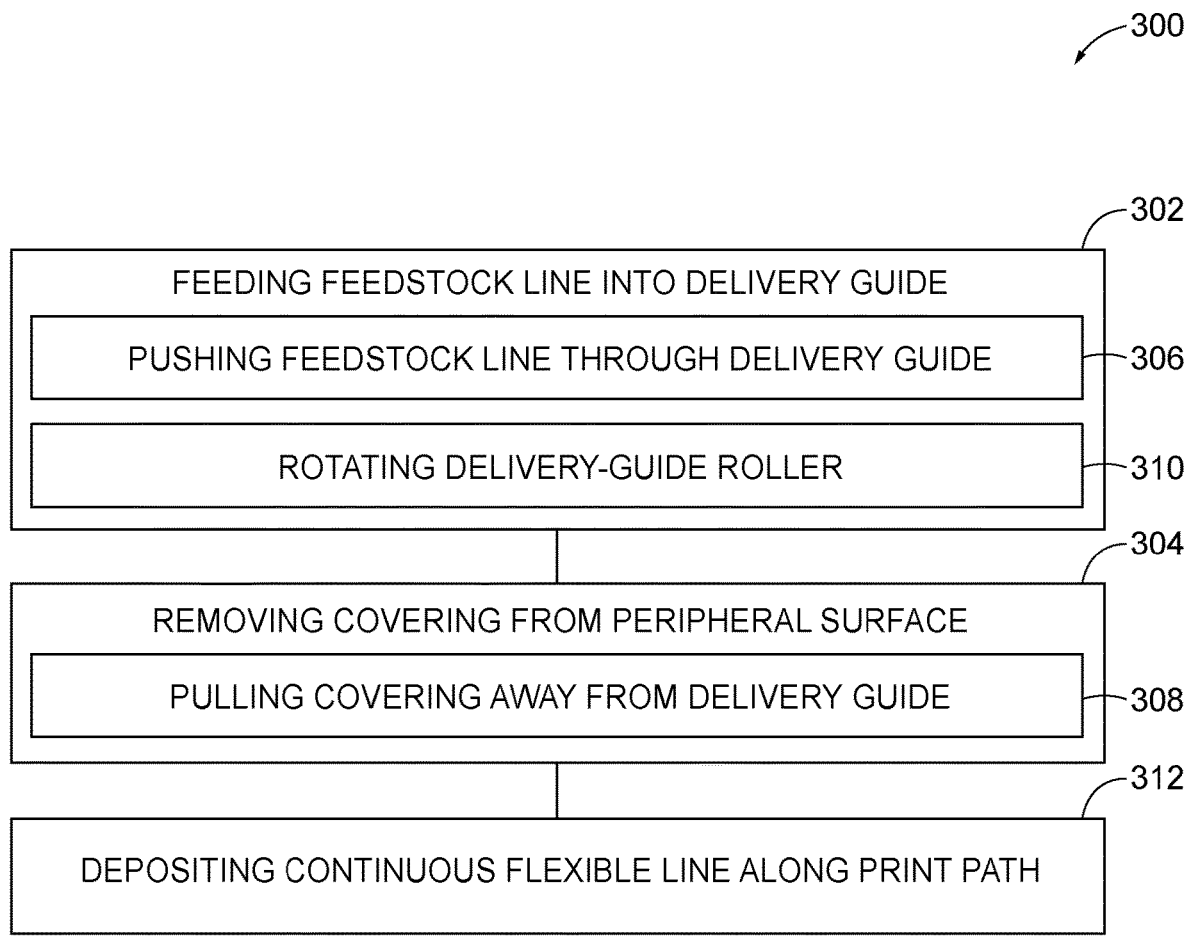
Figure 27:
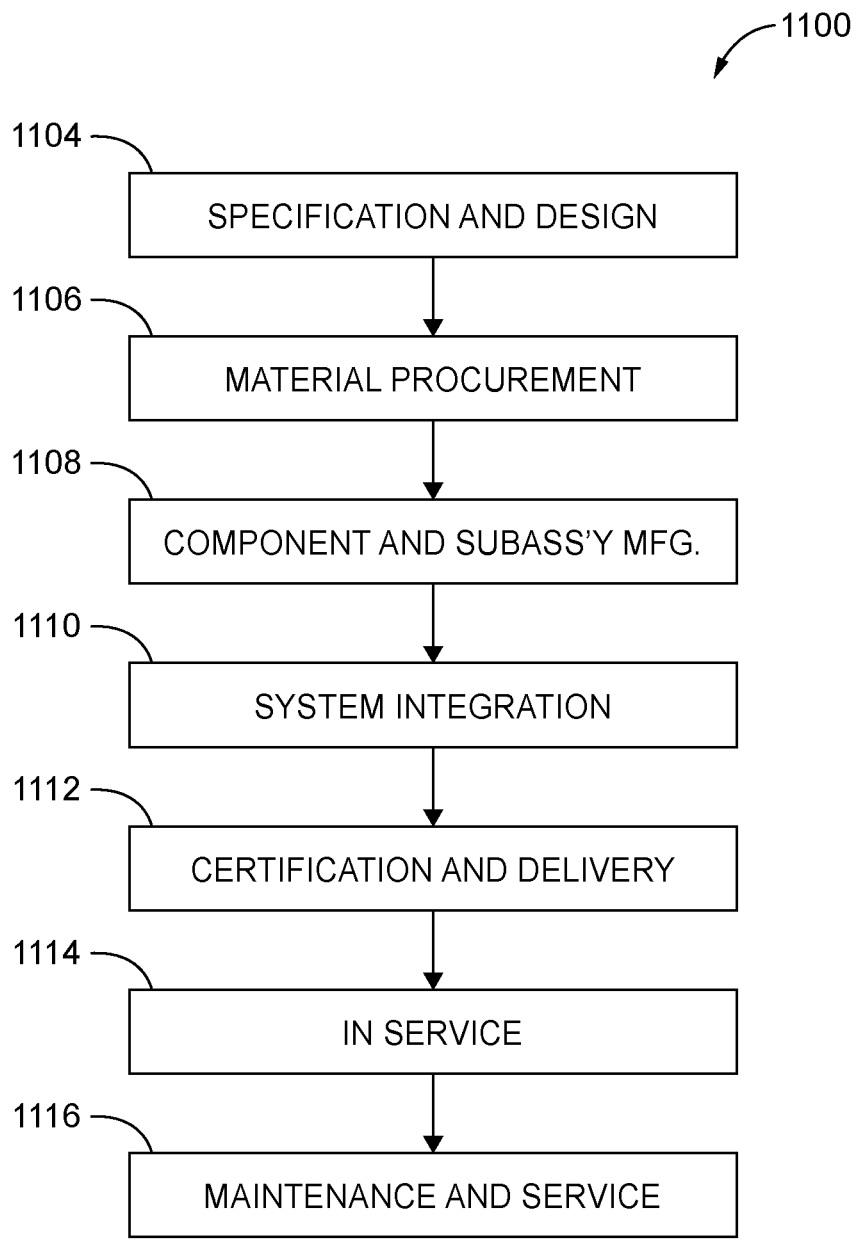

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram schematically representing a feedstock line, according to one or more examples of the present disclosure;

FIG. 2 is a block diagram schematically representing a system for additively manufacturing an object, according to one or more examples of the present disclosure;

FIG. 3 is a schematic representation of a feedstock line of FIG. 1, according to one or more examples of the present disclosure;

FIG. 4 is a schematic representation of a feedstock line of FIG. 1, according to one or more examples of the present disclosure;

FIG. 5 is a schematic representation of a feedstock line of FIG. 1, according to one or more examples of the present disclosure;

FIG. 6 is a schematic representation of a feedstock line of FIG. 1, according to one or more examples of the present disclosure;

FIG. 7 is a schematic representation of a feedstock line of FIG. 1, according to one or more examples of the present disclosure;

FIG. 8 is a schematic representation of a feedstock line of FIG. 1, according to one or more examples of the present disclosure;

FIG. 9 is a schematic representation of a feedstock line of FIG. 1, according to one or more examples of the present disclosure;

FIG. 10 is a schematic representation of a feedstock line of FIG. 1, according to one or more examples of the present disclosure;

FIG. 11 is a schematic representation of a feedstock line of FIG. 1, according to one or more examples of the present disclosure;

FIG. 12 is a schematic representation of a feedstock line of FIG. 1, according to one or more examples of the present disclosure;

FIG. 13 is a schematic representation of a feedstock line of FIG. 1, according to one or more examples of the present disclosure;

FIG. 14 is a schematic fragmentary representation of a flange of a covering of a feedstock line of FIG. 1, according to one or more examples of the present disclosure;

FIG. 15 is a schematic representation of a system of FIG. 2, according to one or more examples of the present disclosure;

FIG. 16 is a schematic representation of a system of FIG. 2, according to one or more examples of the present disclosure;

FIG. 17 is a schematic representation of a system of FIG. 2, according to one or more examples of the present disclosure;

FIG. 18 is a schematic representation of a delivery guide of a system of FIG. 2, together with a feedstock line, according to one or more examples of the present disclosure;

FIG. 19 is a schematic representation of a feed mechanism of a system of FIG. 2, together with a feedstock line, according to one or more examples of the present disclosure;

FIG. 20 is a schematic representation of a feed mechanism of a system of FIG. 2, together with a feedstock line, according to one or more examples of the present disclosure;

FIG. 21 is a schematic representation of a covering-drive mechanism of a system of FIG. 2, together with a covering, according to one or more examples of the present disclosure;

FIG. 22 is a schematic representation of a system of FIG. 2, according to one or more examples of the present disclosure;

FIG. 23 is a schematic representation of the delivery guide of the system of FIG. 22, together with a feedstock line, according to one or more examples of the present disclosure;

FIG. 24 is a schematic representation of a system of FIG. 2, according to one or more examples of the present disclosure;

FIG. 25 is a schematic representation of the delivery guide of the system of FIG. 24, according to one or more examples of the present disclosure;

FIG. 26 is a block diagram of a method of additively manufacturing an object, according to one or more examples of the present disclosure;

FIG. 27 is a block diagram of aircraft production and service methodology; and

Figure 28:
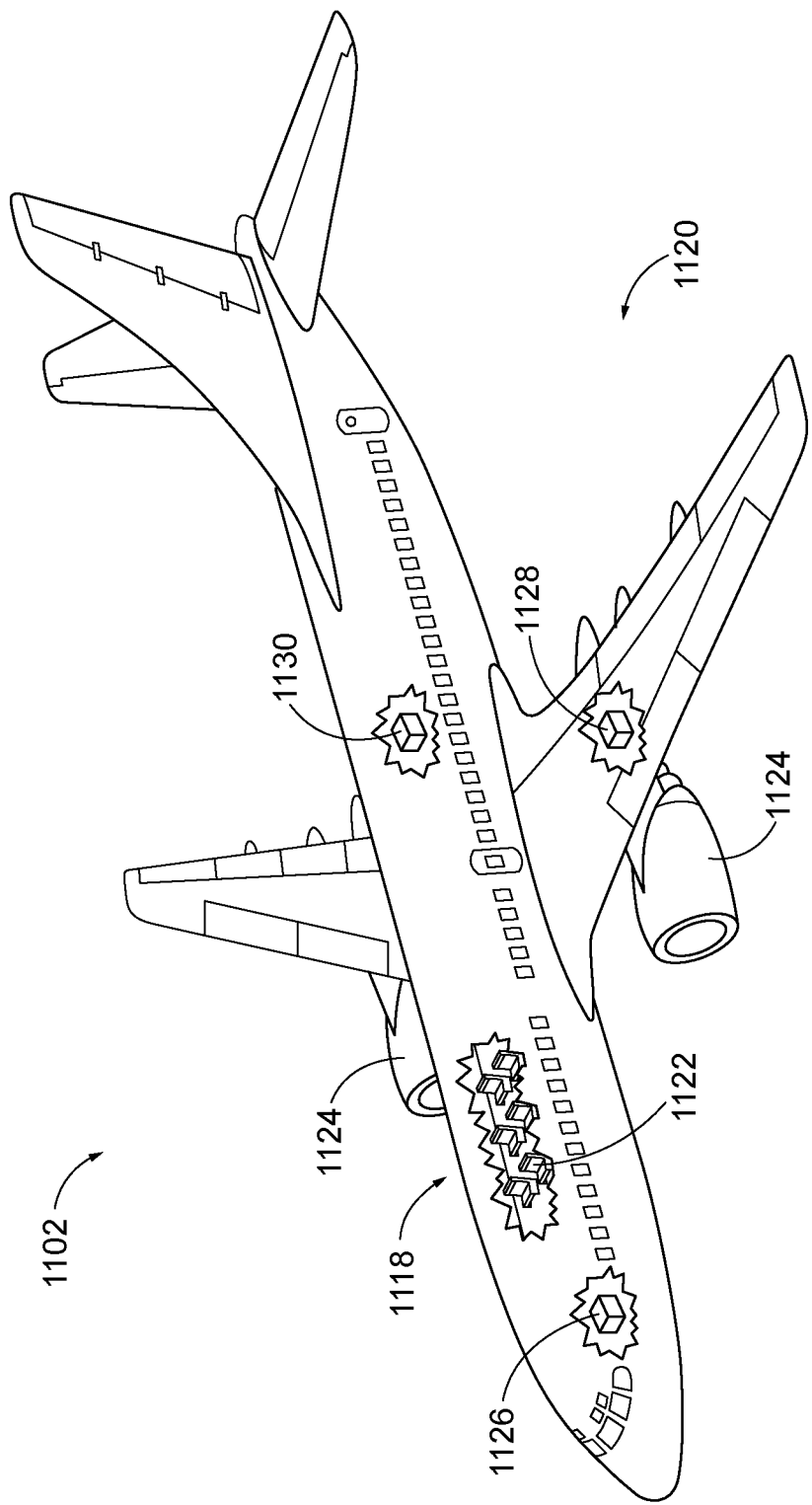

FIG. 28 is a schematic illustration of an aircraft.

DESCRIPTION

In FIGS. 1 and 2, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIGS. 1 and 2 may be combined in various ways without the need to include other features described in FIGS. 1 and 2, other drawing figures, and/or the accompanying disclosure, even though such combination or combinations are not explicitly illustrated herein. Similarly, additional features not limited to the examples presented, may be combined with some or all of the features shown and described herein.

In FIGS. 26 and 27, referred to above, the blocks may represent operations and/or portions thereof, and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 26 and 27 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according to the present disclosure are provided below.

Referring generally to FIG. 1 and particularly to, e.g., FIGS. 3-13, feedstock line 100 for additively manufacturing object 108 is disclosed. Feedstock line 100 has a length and comprises continuous flexible line 102. Continuous flexible line 102 has peripheral surface 104. Feedstock line 100 also comprises covering 106. Covering 106 is releasably coupled to peripheral surface 104 of continuous flexible line 102. The preceding subject matter of this paragraph characterizes example 1 of the present disclosure.

Covering 106, when coupled to peripheral surface 104, facilitates the handling of feedstock line 100, such as by an associated additive manufacturing system (e.g., system 200 herein) that utilizes continuous flexible line 102 for additively manufacturing object 108. For example, continuous flexible line 102, in some examples, may be uncured or only partially cured when part of feedstock line 100, and thus may be tacky, sticky, or otherwise difficult to handle by a user of an associated additive manufacturing system (e.g., system 200 herein) without damage to continuous flexible line 102 or without soiling of the associated additive manufacturing system or a user thereof. In addition, covering 106 may provide a sufficient rigidity to feedstock line 100, such that an associated additive manufacturing system (e.g., system 200 herein) may more easily handle feedstock line 100 when compared to continuous flexible line 102 by itself. Moreover, by being removably coupled to peripheral surface 104 of continuous flexible line 102, covering 106 may be easily removed from continuous flexible line 102, such as by an associated additive manufacturing system (e.g., system 200 herein), for additively manufacturing object 108 with continuous flexible line 102.

Additionally, in some examples, covering 106 protects continuous flexible line 102 from undesirable or premature exposure to the surrounding environment. For example, in some examples, continuous flexible line 102 may be at least partially constructed of a material that is configured to cure responsive to exposure to electromagnetic radiation or ambient air. In such examples, covering 106 may shield continuous flexible line 102 from such exposure. Moreover, feedstock line 100 therefore may be more easily stored and transported, as well as utilized by an associated additive manufacturing system (e.g., system 200 herein), without the need to separately, or expensively, shield feedstock line 100 from environmental exposure.

As used herein, a "continuous flexible line" is an elongate structure having a length significantly longer than a dimension (e.g., diameter or width) that is transverse, or perpendicular, to its length. As an illustrative, non-exclusive example, continuous flexible line 102 may have a length that is at least 100, at least 1000, at least 10000, at least 100000, or at least 1000000 times greater than its diameter or width.

Continuous flexible line 102 may take any suitable form and be constructed of any suitable material for use as a feedstock for material construction utilizing an additive manufacturing process. For example, as discussed herein, continuous flexible line 102 may be a fiber-reinforced composite plastic, although other constructions of continuous flexible line 102 are within the scope of the present disclosure.

While the examples of FIGS. 3-13 all illustrate continuous flexible line 102 with a circular cross-section, various shapes of continuous flexible line 102 may be used. For example, in some applications, continuous flexible line 102 having a generally rectangular cross-section may facilitate nesting and/or compacting of continuous flexible line 102 against itself during an additive manufacturing process.

Covering 106 may be a thin film material and may be constructed of any suitable material, illustrative, non-exclusive examples of which include, but are not limited to, paper and plastic films. In some examples, covering 106 may be an adhesive-backed film. In other examples, the surface properties of peripheral surface 104 may operatively couple and release covering 106 from peripheral surface 104.

Referring generally to FIG. 1 and particularly to, e.g., FIGS. 3-9 and 11, covering 106 fully and circumferentially encloses peripheral surface 104 of continuous flexible line 102. The preceding subject matter of this paragraph characterizes example 2 of the present disclosure, wherein example 2 also includes the subject matter according to example 1, above.

By covering 106 fully and circumferentially enclosing peripheral surface 104 of continuous flexible line 102, feedstock line 100 may be more easily handled by an associated additive manufacturing system (e.g., system 200 herein) or a user thereof when compared to other examples of feedstock line 100 in which covering 106 does not fully and circumferentially enclose peripheral surface 104. Additionally, depending on the material properties of continuous flexible line 102, covering 106 may serve to maintain the material from which continuous flexible line 102 is constructed in a generally desired shape or volume.

Referring generally to FIG. 1 and particularly to, e.g., FIGS. 10, 12, and 13, peripheral surface 104 of continuous flexible line 102 comprises at least one region 110, not covered by covering 106 and extending along all of the length of feedstock line 100. The preceding subject matter of this paragraph characterizes example 3 of the present disclosure, wherein example 3 also includes the subject matter according to example 1, above.

Examples of feedstock line 100, in which covering 106 does not fully cover peripheral surface 104 of continuous flexible line 102 may be less expensive to construct than other examples. Additionally or alternatively, in such examples, covering 106 may be more easily removed from continuous flexible line 102 when being processed by an associated additive manufacturing system (e.g., system 200 herein) or when a user is setting up such an associated additive manufacturing system for use of continuous flexible line 102 to additively manufacture object 108.

Referring generally to FIG. 1 and particularly to, e.g., FIGS. 10, 12, and 13, at least one region 110 of peripheral surface 104 of continuous flexible line 102 comprises two regions, circumferentially spaced apart from each other around continuous flexible line 102. The preceding subject matter of this paragraph characterizes example 4 of the present disclosure, wherein example 4 also includes the subject matter according to example 3, above.

By including two regions 110 circumferentially spaced apart from each other, each region 110 of covering 106 may more easily be removed from continuous flexible line 102.

Referring generally to FIG. 1 and particularly to, e.g., FIGS. 3-13, covering 106 comprises at least one member 112, extending along all of the length of feedstock line 100. The preceding subject matter of this paragraph characterizes example 5 of the present disclosure, wherein example 5 also includes the subject matter according to any one of examples 1 to 4, above.

By extending along all of the length of feedstock line 100, member 112 may be continuously removed from continuous flexible line 102 as feedstock line 100 is being consumed by an associated additive manufacturing system (e.g., system 200 herein) to additively manufacture object 108. That is, such an associated additive manufacturing system is not required to sequentially remove distinct members of covering 106 along the longitudinal length of feedstock line 100, as feedstock line 100 is being consumed.

Referring generally to FIG. 1 and particularly to, e.g., FIGS. 3-7, at least one member 112 of covering 106 is a single member. The preceding subject matter of this paragraph characterizes example 6 of the present disclosure, wherein example 6 also includes the subject matter according to example 5, above.

When covering 106 comprises only a single member 112, an associated additive manufacturing system (e.g., system 200 herein) may require fewer components to remove covering 106 from continuous flexible line 102 when the associated additive manufacturing system is additively manufacturing object 108.

Referring generally to FIG. 1 and particularly to, e.g., FIG. 4, the single member overlaps itself along all of the length of feedstock line 100. The preceding subject matter of this paragraph characterizes example 7 of the present disclosure, wherein example 7 also includes the subject matter according to example 6, above.

When covering 106 overlaps itself along all of the length of feedstock line 100, initiation of removal of covering 106 from continuous flexible line 102 may be easily facilitated. Moreover, construction of feedstock line 100 may be facilitated, in so far as it may be easier to apply covering 106 to continuous flexible line 102 and result in an overlap, such as seen in the example of FIG. 4, than to apply covering 106 to continuous flexible line 102 and result in, or attempt to result in, no overlap, such as seen in the example of FIG. 3.

Depending on the material of construction of covering 106, at the overlap, covering 106 may be thermoplastically welded to itself. Alternatively, a pressure-sensitive adhesive may be utilized at the overlap to releasably couple covering 106 to itself.

Referring generally to FIG. 1 and particularly to, e.g., FIG. 9, at least one member 112 of covering 106 comprises a plurality of members. Members of at least subset 114 of the plurality of members overlap each other along all of the length of feedstock line 100. The preceding subject matter of this paragraph characterizes example 8 of the present disclosure, wherein example 8 also includes the subject matter according to example 5, above.

When covering 106 comprises a plurality of members 112, removal of covering 106 may be facilitated, such as by avoiding a single member that circumferentially surrounds continuous flexible line 102 detrimentally affecting the integrity of continuous flexible line 102 when such a single member is being pulled away from continuous flexible line 102 from a single side of continuous flexible line 102.

Referring generally to FIG. 1 and particularly to, e.g., FIGS. 6, 7, and 11-13, covering 106 comprises at least one member 112, extending along all of the length of feedstock line 100. Covering 106 comprises at least one flange 116, extending away from continuous flexible line 102 along all of the length of feedstock line 100. The preceding subject matter of this paragraph characterizes example 9 of the present disclosure, wherein example 9 also includes the subject matter according to any one of examples 1 to 8, above.

Inclusion of at least one flange 116 facilitates handling of feedstock line 100, for example, by an associated additive manufacturing system (e.g., system 200 herein). For example, flange 116 may facilitate engagement and advancement of feedstock line 100 by opposing rollers of such an associated additive manufacturing system.

Referring generally to FIG. 1 and particularly to, e.g., FIGS. 6 and 7, at least one flange 116 is a single flange. The preceding subject matter of this paragraph characterizes example 10 of the present disclosure, wherein example 10 also includes the subject matter according to example 9, above.

Inclusion of only a single flange 116 may facilitate construction of feedstock line 100 and may simplify the mechanisms required of an associated additive manufacturing system (e.g., system 200 herein) to engage and advance feedstock line 100.

Referring generally to FIG. 1 and particularly to, e.g., FIGS. 11-13, at least one flange 116 comprises two opposed flanges. The preceding subject matter of this paragraph characterizes example 11 of the present disclosure, wherein example 11 also includes the subject matter according to example 9, above.

Inclusion of two opposed flanges 116 may facilitate precise advancement of feedstock line 100 and ultimate dispensing of continuous flexible line 102 by an associated additive manufacturing system (e.g., system 200 herein). For example, by advancing feedstock line 100 through engagement of two opposing flanges 116, undesirable torques on feedstock line 100 may be avoided. Additionally or alternatively, torques may be purposefully applied to feedstock line 100 by advancing opposing flanges 116 at different rates to purposefully create a curve in feedstock line 100 as it is advanced.

Referring generally to FIG. 1 and particularly to, e.g., FIG. 7, at least one member 112 of covering 106 is a single member. At least one flange 116 comprises the single member of covering 106, folded against itself along all of the length of feedstock line 100. The preceding subject matter of this paragraph characterizes example 12 of the present disclosure, wherein example 12 also includes the subject matter according to example 9 or 11, above.

Construction of flange 116 from a single member 112 of covering 106 folded against itself may facilitate construction of flange 116 during manufacturing of feedstock line 100. Additionally or alternatively, folding covering 106 against itself to construct flange 116 may avoid the peeling apart of flange 116 and thus the inadvertent removal of covering 106 from continuous flexible line 102.

Referring generally to FIG. 1 and particularly to, e.g., FIGS. 11 and 13, at least one member 112 of covering 106 comprises two members. At least one flange 116 comprises the two members of covering 106, adhered to each other. The preceding subject matter of this paragraph characterizes example 13 of the present disclosure, wherein example 13 also includes the subject matter according to example 9 or 11, above.

Construction of flange 116 from two members 112 adhered to each other facilitates the purposeful peeling of the two members apart for removal of covering 106 from continuous flexible line 102.

In some examples, the two members may be adhered to each other utilizing pressure-sensitive adhesive.

Referring generally to FIG. 1 and particularly to, e.g., FIG. 14, at least one flange 116 comprises depressions 118 or holes 120, spaced along all of the length of feedstock line 100. The preceding subject matter of this paragraph characterizes example 14 of the present disclosure, wherein example 14 also includes the subject matter according to any one of examples 9 to 13, above.

By including depressions 118 or holes 120 in flange 116, an associated additive manufacturing system (e.g., system 200 herein) may precisely advance feedstock line 100 when additively manufacturing object 108. That is, the feed rate of feedstock line 100 may be controlled precisely.

Referring generally to FIG. 1 and particularly to, e.g., FIG. 5, covering 106 comprises notch 122, extending along all of the length of feedstock line 100. The preceding subject matter of this paragraph characterizes example 15 of the present disclosure, wherein example 15 also includes the subject matter according to any one of examples 1 to 14, above.

Inclusion of notch 122 may facilitate the initiation of and continuous removal of covering 106 from continuous flexible line 102.

For example, notch 122 may be a linear region of reduced thickness of covering 106, such that the region is easily torn or cut, for example by an associated additive manufacturing system (e.g., system 200 herein). Notch 122 additionally or alternatively may be described as a score, a score line, or a perforation in covering 106.

Referring generally to FIG. 1 and particularly to, e.g., FIGS. 3-13, continuous flexible line 102 comprises elongate filaments 124, extending along all of the length of feedstock line 100, and resin 126, at least partially covering elongate filaments 124. The preceding subject matter of this paragraph characterizes example 16 of the present disclosure, wherein example 16 also includes the subject matter according to any one of examples 1 to 15, above.

Inclusion of elongate filaments 124 within a matrix of resin 126 facilitates the manufacture of object 108 with desirable properties, such as based on the predetermined orientation of elongate filaments 124 within object 108.

Elongate filaments 124 may take any suitable form and be constructed of any suitable material depending on desired properties of object 108 to be manufactured from feedstock line 100. Example filaments 124 include, but are not limited to, fibers, carbon fibers, glass fibers, synthetic organic fibers, aramid fibers, natural fibers, wood fibers, boron fibers, silicon-carbide fibers, optical fibers, fiber bundles, fiber tows, fiber weaves, wires, metal wires, conductive wires, and wire bundles. Continuous flexible line 102 may include a single configuration, or type, of elongate filaments 124 or may include more than one configuration, or type, of elongate filaments 124.

Resin 126 may take any suitable form depending on desired properties of object 108 and depending on the functionality of an associated additive manufacturing system (e.g., system 200 herein) that utilizes feedstock line 100. In some examples, resin 126 may comprise a photopolymer resin that is configured to be cured by selective application of light. In other examples, resin 126 may comprise a thermoset resin that is configured to be cured by selective application of heat or radiation, and/or by time above a threshold curing temperature.

Referring generally to FIG. 2 and particularly to, e.g., FIGS. 3-13, 15-17, 22, and 24, system 200 for additively manufacturing object 108 by depositing continuous flexible line 102 along print path 216 is disclosed. System 200 comprises delivery guide 202, which is configured to receive feedstock line 100. Feedstock line 100 has a length and comprises continuous flexible line 102. Continuous flexible line 102 has peripheral surface 104. Feedstock line 100 further comprises covering 106, releasably coupled to peripheral surface 104 of continuous flexible line 102. Delivery guide 202 is also configured to deposit continuous flexible line 102 along print path 216. System 200 additionally comprises covering-removal mechanism 204, configured to remove covering 106 from peripheral surface 104 of continuous flexible line 102 before continuous flexible line 102 is deposited along print path 216 by delivery guide 202. The preceding subject matter of this paragraph characterizes example 17 of the present disclosure.

System 200 therefore may be used to manufacture object 108 from continuous flexible line 102. Because covering 106 is releasably coupled to peripheral surface 104, feedstock line 100 may be handled by system 200 without continuous flexible line 102 undesirably coming into direct contact with component parts of system 200. Moreover, covering 106 provides a sufficient rigidity to feedstock line 100 so that feedstock line 100 may be advanced through system 200, including into and through delivery guide 202. For example, continuous flexible line 102, in some examples, may be uncured or only partially cured when part of feedstock line 100, and thus may be tacky, sticky, limp, soft, flexible, or otherwise difficult to handle by a user of system 200 without damage to continuous flexible line 102 or without soiling of system 200 or a user thereof. Moreover, by being removably coupled to peripheral surface 104 of continuous flexible line 102, covering 106 may be easily removed from continuous flexible line 102 by covering-removal mechanism 204 for additively manufacturing object 108 with continuous flexible line 102.

Additionally, in some examples, covering 106 protects continuous flexible line 102 from undesirable or premature exposure to the surrounding environment. For example, in some examples, continuous flexible line 102 may be at least partially constructed of a material that is configured to cure responsive to exposure to electromagnetic radiation or ambient air. In such examples, covering 106 may shield continuous flexible line 102 from such exposure, until such time that covering-removal mechanism 204 operably removes covering 106 from peripheral surface 104 of continuous flexible line 102. Moreover, feedstock line 100 therefore may be more easily stored and transported, as well as utilized by system 200, without the need to separately, or expensively, shield feedstock line 100 from environmental exposure.

Some examples of system 200 additionally or alternatively may be described as 3-D printers. Some examples of delivery guide 202 additionally or alternatively may be described as nozzles or print heads.

Referring generally to FIG. 2 and particularly to, e.g., FIGS. 15-17, 22, and 24, system 200 also comprises feedstock-line supply 206, configured to deliver feedstock line 100 to delivery guide 202. The preceding subject matter of this paragraph characterizes example 18 of the present disclosure, wherein example 18 also includes the subject matter according to example 17, above.

Feedstock-line supply 206 is a source of feedstock line 100 for system 200 to additively manufacture object 108 from continuous flexible line 102.

Feedstock-line supply 206 may take any suitable configuration. For example, feedstock-line supply 206 may comprise a spool of feedstock line 100, and because feedstock line 100 comprises covering 106, feedstock line 100 may engage itself on the spool without detrimental effect to feedstock line 100 and feedstock-line supply 206. That is, covering 106 may serve as a barrier around continuous flexible line 102, such that the material from which continuous flexible line 102 is constructed does not become damaged, does not undesirably change physical properties, and/or does not soil component parts of system 200.

Referring generally to FIG. 2 and particularly to, e.g., FIGS. 3-9 and 11, covering 106 fully and circumferentially encloses peripheral surface 104 of continuous flexible line 102. The preceding subject matter of this paragraph characterizes example 19 of the present disclosure, wherein example 19 also includes the subject matter according to example 17 or 18, above.

By covering 106 fully and circumferentially enclosing peripheral surface 104 of continuous flexible line 102, feedstock line 100 may be more easily handled by system 200 or a user thereof when compared to other examples of feedstock line 100 in which covering 106 does not fully and circumferentially enclose peripheral surface 104. Additionally, depending on the material properties of continuous flexible line 102, covering 106 may serve to maintain the material from which continuous flexible line 102 is constructed in a generally desired shape or volume.

Referring generally to FIG. 2 and particularly to, e.g., FIGS. 10, 12, and 13, peripheral surface 104 of continuous flexible line 102 comprises at least one region 110, not covered by covering 106 and extending along all of the length of feedstock line 100. The preceding subject matter of this paragraph characterizes example 20 of the present disclosure, wherein example 20 also includes the subject matter according to example 17 or 18, above.

Examples of feedstock line 100, in which covering 106 does not fully cover peripheral surface 104 of continuous flexible line 102 may be less expensive to construct than other examples. Additionally or alternatively, in such examples, covering 106 may be more easily removed from continuous flexible line 102 by covering-removal mechanism 204 or when a user is setting up system 200 for use of continuous flexible line 102 to additively manufacture object 108.

Referring generally to FIG. 2 and particularly to, e.g., FIGS. 10,12, and 13, at least one region 110 of peripheral surface 104 of continuous flexible line 102 comprises two regions, circumferentially spaced apart from each other around continuous flexible line 102. The preceding subject matter of this paragraph characterizes example 21 of the present disclosure, wherein example 21 also includes the subject matter according to example 20, above.

By including two regions 110 circumferentially spaced apart from each other, each region 110 of covering 106 may more easily be removed from continuous flexible line 102 by covering-removal mechanism 204.

Referring generally to FIG. 2 and particularly to, e.g., FIGS. 3-13, covering 106 comprises at least one member 112, extending along all of the length of feedstock line 100. The preceding subject matter of this paragraph characterizes example 22 of the present disclosure, wherein example 22 also includes the subject matter according to any one of examples 17 to 21, above.

By extending along all of the length of feedstock line 100, member 112 may be continuously removed from continuous flexible line 102 by covering-removal mechanism 204 as feedstock line 100 is being consumed by system 200 to additively manufacture object 108. That is, system 200 is not required to sequentially remove distinct members of covering 106 along the longitudinal length of feedstock line 100, as feedstock line 100 is being consumed.

Referring generally to FIG. 2 and particularly to, e.g., FIGS. 3-7, at least one member 112 of covering 106 is a single member. The preceding subject matter of this paragraph characterizes example 23 of the present disclosure, wherein example 23 also includes the subject matter according to example 22, above.

When covering 106 comprises only a single member 112, covering-removal mechanism 204 may require fewer components to remove covering 106 from continuous flexible line 102 when system 200 is additively manufacturing object 108.

Referring generally to FIG. 2 and particularly to, e.g., FIG. 4, the single member overlaps itself along all of the length of feedstock line 100. The preceding subject matter of this paragraph characterizes example 24 of the present disclosure, wherein example 24 also includes the subject matter according to example 23, above.

When covering 106 overlaps itself along all of the length of feedstock line 100, initiation of removal of covering 106 from continuous flexible line 102 may be easily facilitated.

Referring generally to FIG. 2 and particularly to, e.g., FIG. 9, at least one member 112 of covering 106 comprises a plurality of members. Members of at least subset 114 of the plurality of members overlap each other along all of the length of feedstock line 100. The preceding subject matter of this paragraph characterizes example 25 of the present disclosure, wherein example 25 also includes the subject matter according to example 22, above.

When covering 106 comprises a plurality of members 112, removal of covering 106 may be facilitated, such as by avoiding a single member that circumferentially surrounds continuous flexible line 102 detrimentally affecting the integrity of continuous flexible line 102 when such a single member is being pulled away from continuous flexible line 102 from a single side of continuous flexible line 102.

Referring generally to FIG. 2 and particularly to, e.g., FIGS. 6, 7, and 11-13, covering 106 comprises at least one member 112, extending along all of the length of feedstock line 100.

Covering 106 comprises at least one flange 116, extending away from continuous flexible line 102 along all of the length of feedstock line 100. The preceding subject matter of this paragraph characterizes example 26 of the present disclosure, wherein example 26 also includes the subject matter according to any one of examples 17 to 25, above.

Inclusion of at least one flange 116 facilitates handling of feedstock line 100 by system 200. For example, flange 116 may facilitate engagement and advancement of feedstock line 100 by opposing feed-rollers 210, as discussed herein.

Referring generally to FIG. 2 and particularly to, e.g., FIGS. 6 and 7, at least one flange 116 is a single flange. The preceding subject matter of this paragraph characterizes example 27 of the present disclosure, wherein example 27 also includes the subject matter according to example 26, above.

Inclusion of only a single flange 116 may simplify the mechanisms required of system 200 (e.g., feed mechanism 208, discussed herein) to engage and advance feedstock line 100.

Referring generally to FIG. 2 and particularly to, e.g., FIGS. 11-13, at least one flange 116 comprises two opposed flanges. The preceding subject matter of this paragraph characterizes example 28 of the present disclosure, wherein example 28 also includes the subject matter according to example 26, above.

Inclusion of two opposed flanges 116 may facilitate precise advancement of feedstock line 100 and ultimate dispensing of continuous flexible line 102 by system 200. For example, by advancing feedstock line 100 through engagement of two opposing flanges 116, undesirable torques on feedstock line 100 may be avoided. Additionally or alternatively, torques may be purposefully applied to feedstock line 100 by advancing opposing flanges 116 at different rates to purposefully create a curve in feedstock line 100 as it is advanced.

Referring generally to FIG. 2 and particularly to, e.g., FIG. 7, at least one member 112 of covering 106 is a single member. At least one flange 116 comprises the single member of covering 106, folded against itself along all of the length of feedstock line 100. The preceding subject matter of this paragraph characterizes example 29 of the present disclosure, wherein example 29 also includes the subject matter according to any one of examples 26 to 28, above.

Folding covering 106 against itself to construct flange 116 may avoid the peeling apart of flange 116 and thus the inadvertent removal of covering 106 from continuous flexible line 102 prior to covering-removal mechanism 204 operatively removing covering 106 from peripheral surface 104 of continuous flexible line 102.

Referring generally to FIG. 2 and particularly to, e.g., FIGS. 11 and 13, at least one member 112 of covering 106 comprises two members. At least one flange 116 comprises the two members of covering 106, adhered to each other. The preceding subject matter of this paragraph characterizes example 30 of the present disclosure, wherein example 30 also includes the subject matter according to any one of examples 26 to 28, above.

Construction of flange 116 from two members 112 adhered to each other facilitates the purposeful peeling of the two members apart for removal of covering 106 from continuous flexible line 102, such as by covering-removal mechanism 204.

Referring generally to FIG. 2 and particularly to, e.g., FIG. 14, at least one flange 116 comprises depressions 118 or holes 120, spaced along all of the length of feedstock line 100. The preceding subject matter of this paragraph characterizes example 31 of the present disclosure, wherein example 31 also includes the subject matter according to any one of examples 26 to 30, above.

By including depressions 118 or holes 120 in flange 116, system 200 may precisely advance feedstock line 100 when additively manufacturing object 108. That is, the feed rate of feedstock line 100 may be controlled precisely.

Referring generally to FIG. 2 and particularly to, e.g., FIG. 5, covering 106 comprises notch 122, extending along all of the length of feedstock line 100. The preceding subject matter of this paragraph characterizes example 32 of the present disclosure, wherein example 32 also includes the subject matter according to any one of examples 17 to 31, above.

Inclusion of notch 122 may facilitate the initiation of and continuous removal of covering 106 from continuous flexible line 102 by covering-removal mechanism 204.

Referring generally to FIG. 2 and particularly to, e.g., FIGS. 3-13, continuous flexible line 102 comprises elongate filaments 124, extending along all of the length of feedstock line 100, and resin 126, at least partially covering elongate filaments 124. The preceding subject matter of this paragraph characterizes example 33 of the present disclosure, wherein example 33 also includes the subject matter according to any one of examples 17 to 32, above.

Inclusion of elongate filaments 124 within a matrix of resin 126 facilitates the manufacture of object 108 with desirable properties, such as based on the predetermined orientation of elongate filaments 124 within object 108.

Referring generally to FIG. 2 and particularly to, e.g., FIGS. 15 and 16, system 200 additionally comprises feed mechanism 208, configured to push feedstock line 100 through delivery guide 202. The preceding subject matter of this paragraph characterizes example 34 of the present disclosure, wherein example 34 also includes the subject matter according to any one of examples 17 to 33, above.

Feed mechanism 208 facilitates the advancement of feedstock line 100 through system 200 and thus the advancement of continuous flexible line 102 into, through, and out of delivery guide 202. Moreover, because feedstock line 100 is pushed through delivery guide 202, covering 106 provides a sufficient rigidity to feedstock line 100 such that feedstock line 100 does not buckle at the inlet to or within delivery guide 202.

In some applications, feed mechanism 208 may only initially push feedstock line 100 through delivery guide 202, and subsequent to continuous flexible line 102 initially being deposited and secured relative to print path 216, the movement of delivery guide 202 relative to print path 216 may operate to pull feedstock line 100, and thus continuous flexible line 102, through delivery guide 202 without feed mechanism 208 needing to continuously and operatively push feedstock line 100 through delivery guide 202. In other applications, feed mechanism 208 may continuously and operatively push feedstock line 100 through delivery guide 202 during an entirety of manufacturing of object 108. In yet other applications, feed mechanism 208 may intermittently push feedstock line 100 through delivery guide 202 during manufacturing of object 108, while at other times feedstock line 100 is pulled through delivery guide 202 simply due to continuous flexible line 102 being secured relative to print path 216 and the movement of delivery guide 202 relative to print path 216. In yet other applications, feed mechanism 208 may only initially or intermittently push feedstock line 100 through delivery guide 202, while at other times feedstock line 100 is pulled through delivery guide 202 due to covering-removal mechanism 204 pulling covering 106 away from delivery guide 202.

Referring generally to FIG. 2 and particularly to, e.g., FIGS. 15, 16, 19, and 20, feed mechanism 208 comprises opposing feed-rollers 210, configured to engage opposite sides of feedstock line 100 and to selectively rotate to push feedstock line 100 through delivery guide 202. The preceding subject matter of this paragraph characterizes example 35 of the present disclosure, wherein example 35 also includes the subject matter according to example 34, above.

Opposing feed-rollers 210, when selectively rotated, act to frictionally engage feedstock line 100, thereby feeding it between opposing feed-rollers 210 and pushing it into and through delivery guide 202.

Referring generally to FIG. 2 and particularly to, e.g., FIGS. 19 and 20, opposing feed-rollers 210 have feedstock-line engagement surfaces 212 that are geometrically complementary to feedstock line 100. The preceding subject matter of this paragraph characterizes example 36 of the present disclosure, wherein example 36 also includes the subject matter according to example 35, above.

By feedstock-line engagement surfaces 212 being geometrically complementary to feedstock line 100, opposing feed-rollers 210 may frictionally engage a significant portion of an outer surface of feedstock line 100 for operative advancement by feed mechanism 208. Moreover, the integrity (e.g., the cross-sectional shape) of feedstock line 100 and thus continuous flexible line 102 may be maintained despite the frictional engagement of feedstock line 100 by feedstock-line engagement surfaces 212.

Referring generally to FIG. 2 and particularly to, e.g., FIGS. 6, 7, 11-13, 19 and 20, covering 106 comprises at least one flange 116, extending away from continuous flexible line 102 along all of the length of feedstock line 100. Opposing feed-rollers 210 have feedstock-line engagement surfaces 212, shaped to engage at least one flange 116. The preceding subject matter of this paragraph characterizes example 37 of the present disclosure, wherein example 37 also includes the subject matter according to example 35 or 36, above.

Feedstock-line engagement surfaces 212 that are shaped to engage flange 116 serve to geometrically complement feedstock line 100, provide a suitable frictional engagement between flange 116 and feedstock-line engagement surfaces 212, and maintain the integrity of feedstock line 100 and thus continuous flexible line 102 as feedstock line 100 is being advanced by feed mechanism 208.

Referring generally to FIG. 2 and particularly to, e.g., FIGS. 6, 7, 11-13, 14, and 19, covering 106 comprises at least one flange 116, extending away from continuous flexible line 102 along all of the length of feedstock line 100. At least one flange 116 comprises depressions 118 or holes 120, spaced apart along all of the length of feedstock line 100. Opposing feed-rollers 210 are configured to engage depressions 118 or holes 120 to drive feedstock line 100 through delivery guide 202. The preceding subject matter of this paragraph characterizes example 38 of the present disclosure, wherein example 38 also includes the subject matter according to any one of examples 35 to 37, above.

Inclusion of, and engagement between, depressions 118 or holes 120 of flange 116 and opposing feed-rollers 210 permits feed mechanism 208 to precisely advance feedstock line 100 into and through delivery guide 202 without undesirable slippage between feedstock line 100 and feed mechanism 208.

In some such examples, opposing feed-rollers 210 comprise projections 236 spaced apart around at least one of opposing feed-rollers 210 and sized to extend into and engage depressions 118 or holes 120.

Referring generally to FIG. 2 and particularly to, e.g., FIG. 18, delivery guide 202 comprises internal passage 214, through which feedstock line 100 extends. Internal passage 214 has a cross-sectional shape that corresponds to a cross-sectional shape of feedstock line 100. The preceding subject matter of this paragraph characterizes example 39 of the present disclosure, wherein example 39 also includes the subject matter according to any one of examples 17 to 38, above.

By internal passage 214 of delivery guide 202 having a cross-sectional shape that corresponds to the cross-sectional shape of feedstock line 100, clearance between feedstock line 100 and internal passage 214 may be minimized. Accordingly, feedstock line 100 may be less susceptible to kinking, bunching, or otherwise deforming within internal passage 214 as it is advanced through delivery guide 202.

Referring generally to FIG. 2 and particularly to, e.g., FIGS. 15-17, 22, and 24, covering-removal mechanism 204 comprises covering-drive mechanism 222, configured to pull covering 106 away from delivery guide 202. The preceding subject matter of this paragraph characterizes example 40 of the present disclosure, wherein example 40 also includes the subject matter according to any one of examples 17 to 39, above.

Pulling covering 106 away from delivery guide 202 by covering-drive mechanism 222 serves to remove covering 106 from peripheral surface 104 of continuous flexible line 102, so that continuous flexible line 102 may be deposited to additively manufacture object 108. In addition, pulling covering 106 away from delivery guide 202 provides clearance between delivery guide 202 and print path 216 for operative and precise movement of delivery guide 202 relative to print path 216.

Referring generally to FIG. 2 and particularly to, e.g., FIGS. 17, 22, and 24, covering-drive mechanism 222 is also configured to pull feedstock line 100 through delivery guide 202. The preceding subject matter of this paragraph characterizes example 41 of the present disclosure, wherein example 41 also includes the subject matter according to example 40, above.

By not only pulling covering 106 away from delivery guide 202, and thus removing covering 106 from continuous flexible line 102, but also pulling feedstock line 100 through delivery guide 202, the advancement of feedstock line 100 through system 200, and thus the dispensing of continuous flexible line 102 from delivery guide 202, may be controlled by covering-drive mechanism 222. In some systems 200, a separate feed mechanism, such as feed mechanism 208, may not be required.

Referring generally to FIG. 2 and particularly to, e.g., FIGS. 17, 22, and 24, system 200 is devoid of a feed mechanism to push feedstock line 100 through delivery guide 202. The preceding subject matter of this paragraph characterizes example 42 of the present disclosure, wherein example 42 also includes the subject matter according to example 40 or 41, above.

Systems 200 that are devoid of a feed mechanism, such as feed mechanism 208 included in other systems 200, may be less expensive to manufacture and maintain.

Referring generally to FIG. 2 and particularly to, e.g., FIGS. 15-17, 21, 22, and 24, covering-drive mechanism 222 comprises opposing covering rollers 224, configured to engage opposite sides of covering 106 and to selectively rotate to pull covering 106 away from delivery guide 202. The preceding subject matter of this paragraph characterizes example 43 of the present disclosure, wherein example 43 also includes the subject matter according to any one of examples 40 to 42, above.

Opposing covering rollers 224, when selectively rotated, act to frictionally engage covering 106, or member 112 thereof, thereby feeding it between opposing covering rollers 224 and pulling it away from delivery guide 202.

Referring generally to FIG. 2 and particularly to, e.g., FIGS. 6, 7, 11-14, and 21, covering 106 comprises at least one flange 116, extending away from continuous flexible line 102 along all of the length of feedstock line 100. At least one flange 116 comprises depressions 118 or holes 120, spaced along all of the length of feedstock line 100. Opposing covering rollers 224 are configured to engage depressions 118 or holes 120 to drive covering 106 away from delivery guide 202. The preceding subject matter of this paragraph characterizes example 44 of the present disclosure, wherein example 44 also includes the subject matter according to example 43, above.

Inclusion of, and engagement between, depressions 118 or holes 120 of flange 116 and opposing covering rollers 224 permits covering-drive mechanism 222 to precisely pull covering 106 away from delivery guide 202 without undesirable slippage between covering 106 and covering-drive mechanism 222.

In some such examples, opposing covering rollers 224 comprise projections 234 spaced apart around at least one of opposing covering rollers 224 and sized to extend into and engage depressions 118 or holes 120.

Referring generally to FIG. 2 and particularly to, e.g., FIGS. 22 and 23, delivery guide 202 comprises open channel 218, shaped to receive a portion of feedstock line 100 as feedstock line 100 is pulled through delivery guide 202 by covering-drive mechanism 222. The preceding subject matter of this paragraph characterizes example 45 of the present disclosure, wherein example 45 also includes the subject matter according to any one of examples 40 to 44, above.

By including open channel 218, as opposed for example to internal passage 214, delivery guide 202 may be constructed of less material and be less expensive to construct.

Referring generally to FIG. 2 and particularly to, e.g., FIGS. 24 and 25, delivery guide 202 comprises delivery-guide roller 220, configured to engage one side of feedstock line 100 and to selectively rotate to advance feedstock line 100 toward print path 216. The preceding subject matter of this paragraph characterizes example 46 of the present disclosure, wherein example 46 also includes the subject matter according to any one of examples 17 to 45, above.

Inclusion of delivery-guide roller 220 may avoid the need for a separate feed mechanism, such as feed mechanism 208 of other systems 200, resulting in a less complex and less expensive system 200.

Referring generally to FIG. 2 and particularly to, e.g., FIGS. 15-17, 22, and 24, system 200 also comprises surface 232 and drive assembly 230. Print path 216 is stationary relative to surface 232 and drive assembly 230 is configured to operatively and selectively move at least one of delivery guide 202 or surface 232 relative to each other to additively manufacture object 108. The preceding subject matter of this paragraph characterizes example 47 of the present disclosure, wherein example 47 also includes the subject matter according to any one of examples 17 to 46, above.

Drive assembly 230 facilitates the relative movement between delivery guide 202 and surface 232 so that object 108 is manufactured from continuous flexible line 102 as it is deposited via delivery guide 202.

Drive assembly 230 may take any suitable form, such that delivery guide 202 and surface 232 may be operatively moved relative to each other in three dimensions for additive manufacturing of object 108. In some examples, drive assembly 230 may be a robotic arm, and delivery guide 202 may be described as an end effector of the robotic arm. Drive assembly 230 may provide for relative movement between delivery guide 202 and surface 232 in any multiple degrees of freedom, including, for example, orthogonally in three dimensions relative to another, in three dimensions with at least three degrees of freedom relative to another, in three dimensions with at least six degrees of freedom relative to another, in three dimensions with at least nine degrees of freedom relative to another, and/or in three dimensions with at least twelve degrees of freedom relative to another.

Referring generally to FIGS. 1 and 2 and particularly to, e.g., FIG. 26, method 300 of additively manufacturing object 108 is disclosed. Method 300 comprises (block 302) feeding feedstock line 100 into delivery guide 202. Feedstock line 100 has a length and comprises continuous flexible line 102. Continuous flexible line 102 has peripheral surface 104. Feedstock line 100 further comprises covering 106, releasably coupled to peripheral surface 104 of continuous flexible line 102. Method 300 also comprises (block 304) removing covering 106 from peripheral surface 104 of continuous flexible line 102 before continuous flexible line 102 is deposited along print path 216 and (block 312) depositing continuous flexible line 102 along print path 216 using delivery guide 202. The preceding subject matter of this paragraph characterizes example 48 of the present disclosure.

Method 300 therefore may be implemented to manufacture object 108 from continuous flexible line 102. Because covering 106 is releasably coupled to peripheral surface 104, feedstock line 100 may be handled, such as by an associated additive manufacturing system (e.g., system 200 herein) or user thereof, prior to covering 106 being removed from continuous flexible line 102. Moreover, covering 106 provides a sufficient rigidity to feedstock line 100 so that feedstock line 100 may be fed into and advanced through delivery guide 202. For example, continuous flexible line 102, in some examples, may be uncured or only partially cured when part of feedstock line 100, and thus may be tacky, sticky, limp, soft, flexible, or otherwise difficult to handle by a user of an associated additive manufacturing system (e.g., system 200 herein) without damage to continuous flexible line 102 or without soiling of the associated additive manufacturing system or a user thereof.

Additionally, in some examples, covering 106 protects continuous flexible line 102 from undesirable or premature exposure to the surrounding environment. For example, in some examples, continuous flexible line 102 may be at least partially constructed of a material that is configured to cure responsive to exposure to electromagnetic radiation or ambient air. In such examples, covering 106 may shield continuous flexible line 102 from such exposure, until such time that covering 106 is removed from peripheral surface 104 of continuous flexible line 102.

Referring generally to FIGS. 1, 3-9, and 11 and particularly to, e.g., FIG. 26, according to method 300, covering 106 fully and circumferentially encloses peripheral surface 104 of continuous flexible line 102. The preceding subject matter of this paragraph characterizes example 49 of the present disclosure, wherein example 49 also includes the subject matter according to example 48, above.

By covering 106 fully and circumferentially enclosing peripheral surface 104 of continuous flexible line 102, feedstock line 100 may be more easily handled when compared to other examples of feedstock line 100 in which covering 106 does not fully and circumferentially enclose peripheral surface 104. Additionally, depending on the material properties of continuous flexible line 102, covering 106 may serve to maintain the material from which continuous flexible line 102 is constructed in a generally desired shape or volume.

Referring generally to FIGS. 1, 10, 12, and 13 and particularly to, e.g., FIG. 26, according to method 300, peripheral surface 104 of continuous flexible line 102 comprises at least one region 110, not covered by covering 106 and extending along all of the length of feedstock line 100. The preceding subject matter of this paragraph characterizes example 50 of the present disclosure, wherein example 50 also includes the subject matter according to example 48, above.

Examples of feedstock line 100, in which covering 106 does not fully cover peripheral surface 104 of continuous flexible line 102 may be less expensive to construct than other examples.

Additionally or alternatively, in such examples, covering 106 may be more easily removed from continuous flexible line 102.

Referring generally to FIGS. 1, 10, 12, and 13 and particularly to, e.g., FIG. 26, according to method 300, at least region 110 of peripheral surface 104 of continuous flexible line 102 comprises two regions, circumferentially spaced apart from each other around continuous flexible line 102. The preceding subject matter of this paragraph characterizes example 51 of the present disclosure, wherein example 51 also includes the subject matter according to example 50, above.

By including two regions 110 circumferentially spaced apart from each other, each region 110 of covering 106 may more easily be removed from continuous flexible line 102.

Referring generally to FIGS. 1 and 3-13 and particularly to, e.g., FIG. 26, according to method 300, covering 106 comprises at least one member 112, extending along all of the length of feedstock line 100. The preceding subject matter of this paragraph characterizes example 52 of the present disclosure, wherein example 52 also includes the subject matter according to any one of examples 48 to 51, above.

By extending along all of the length of feedstock line 100, member 112 may be continuously removed from continuous flexible line 102 as feedstock line 100 is fed through delivery guide 202 and as continuous flexible line 102 is deposited along print path 216 to additively manufacture object 108.

Referring generally to FIGS. 1 and 3-7 and particularly to, e.g., FIG. 26, according to method 300, at least one member 112 of covering 106 is a single member. The preceding subject matter of this paragraph characterizes example 53 of the present disclosure, wherein example 53 also includes the subject matter according to example 52, above.

When covering 106 comprises only a single member 112, an associated additive manufacturing system (e.g., system 200 herein) may require fewer components to remove covering 106 from continuous flexible line 102.

Referring generally to FIGS. 1 and 4 and particularly to, e.g., FIG. 26, according to method 300, the single member of covering 106 overlaps itself along all of the length of feedstock line 100. The preceding subject matter of this paragraph characterizes example 54 of the present disclosure, wherein example 54 also includes the subject matter according to example 53, above.

When covering 106 overlaps itself along all of the length of feedstock line 100, initiation of removal of covering 106 from continuous flexible line 102 may be easily facilitated.

Referring generally to FIGS. 1 and 9 and particularly to, e.g., FIG. 26, according to method 300, at least one member 112 of covering 106 comprises a plurality of members. Members of at least subset 114 of the plurality of members overlap each other along all of the length of feedstock line 100. The preceding subject matter of this paragraph characterizes example 55 of the present disclosure, wherein example 55 also includes the subject matter according to example 52, above.

When covering 106 comprises a plurality of members 112, removal of covering 106 may be facilitated, such as by avoiding a single member that circumferentially surrounds continuous flexible line 102 detrimentally affecting the integrity of continuous flexible line 102 when such a single member is being pulled away from continuous flexible line 102 from a single side of continuous flexible line 102.

Referring generally to FIGS. 1, 6, 7, and 11-13 and particularly to, e.g., FIG. 26, according to method 300, covering 106 comprises at least one member 112, extending along all of the length of feedstock line 100. Covering 106 comprises at least one flange 116, extending away from continuous flexible line 102 along all of the length of feedstock line 100. The preceding subject matter of this paragraph characterizes example 56 of the present disclosure, wherein example 56 also includes the subject matter according to any one of examples 48 to 55, above.

Inclusion of at least one flange 116 facilitates handling of feedstock line 100 by system 200. For example, flange 116 may facilitate engagement and advancement of feedstock line 100 by an associated manufacturing system (e.g., system 200 herein).

Referring generally to FIGS. 1, 6 and 7 and particularly to, e.g., FIG. 26, according to method 300, at least one flange 116 is a single flange. The preceding subject matter of this paragraph characterizes example 57 of the present disclosure, wherein example 57 also includes the subject matter according to example 56, above.

Inclusion of only a single flange 116 may simplify the mechanisms required of an associated additive manufacturing system (e.g., system 200 herein) to engage and advance feedstock line 100.

Referring generally to FIGS. 1 and 12-13 and particularly to, e.g., FIG. 26, according to method 300, at least one flange 116 comprises two opposed flanges. The preceding subject matter of this paragraph characterizes example 58 of the present disclosure, wherein example 58 also includes the subject matter according to example 56, above.

Inclusion of two opposed flanges 116 may facilitate precise advancement of feedstock line 100 and ultimate dispensing of continuous flexible line 102. For example, by advancing feedstock line 100 through engagement of two opposing flanges 116, undesirable torques on feedstock line 100 may be avoided. Additionally or alternatively, torques may be purposefully applied to feedstock line 100 by advancing opposing flanges 116 at different rates to purposefully create a curve in feedstock line 100 as it is advanced.

Referring generally to FIGS. 1 and 7 and particularly to, e.g., FIG. 26, according to method 300, at least one member 112 of covering 106 is a single member. At least one flange 116 comprises the single member of covering 106, folded against itself along all of the length of feedstock line 100. The preceding subject matter of this paragraph characterizes example 59 of the present disclosure, wherein example 59 also includes the subject matter according to any one of examples 56 to 58, above.

Folding covering 106 against itself to construct flange 116 may avoid the peeling apart of flange 116 and thus the inadvertent removal of covering 106 from continuous flexible line 102 prior to removing covering 106 from peripheral surface 104 of continuous flexible line 102.

Referring generally to FIGS. 1, 11, and 13 and particularly to, e.g., FIG. 26, according to method 300, at least one member 112 of covering 106 comprises two members. At least one flange 116 comprises the two members of covering 106, adhered to each other. The preceding subject matter of this paragraph characterizes example 60 of the present disclosure, wherein example 60 also includes the subject matter according to any one of examples 56 to 58, above.

Construction of flange 116 from two members 112 adhered to each other facilitates the purposeful peeling of the two members apart for removal of covering 106 from continuous flexible line 102.

Referring generally to FIGS. 1 and 14 and particularly to, e.g., FIG. 26, according to method 300, at least one flange 116 comprises depressions 118 or holes 120, spaced along all of the length of feedstock line 100. The preceding subject matter of this paragraph characterizes example 61 of the present disclosure, wherein example 61 also includes the subject matter according to any one of examples 56 to 60, above.

By including depressions 118 or holes 120 in flange 116, precise advancement of feedstock line 100 may be accomplished. That is, the feed rate of feedstock line 100 may be controlled precisely.

Referring generally to FIGS. 1 and 5 and particularly to, e.g., FIG. 26, according to method 300, covering 106 comprises notch 122, extending along all of the length of feedstock line 100. The preceding subject matter of this paragraph characterizes example 62 of the present disclosure, wherein example 62 also includes the subject matter according to any one of examples 48 to 61, above.

Inclusion of notch 122 may facilitate the initiation of and continuous removal of covering 106 from continuous flexible line 102.

Referring generally to FIGS. 1 and 3-13 and particularly to, e.g., FIG. 26, according to method 300, continuous flexible line 102 comprises elongate filaments 124, extending along all of the length of feedstock line 100, and resin 126, at least partially covering elongate filaments 124. The preceding subject matter of this paragraph characterizes example 63 of the present disclosure, wherein example 63 also includes the subject matter according to any one of examples 48 to 62, above.

Inclusion of elongate filaments 124 within a matrix of resin 126 facilitates the manufacture of object 108 with desirable properties, such as based on the predetermined orientation of elongate filaments 124 within object 108.

Referring generally to FIGS. 2, 15, and 16 and particularly to, e.g., FIG. 26, according to method 300, feeding feedstock line 100 comprises (block 306) pushing feedstock line 100 through delivery guide 202. The preceding subject matter of this paragraph characterizes example 64 of the present disclosure, wherein example 64 also includes the subject matter according to any one of examples 48 to 63, above.

By pushing feedstock line 100 through delivery guide 202, the feed mechanism (e.g., feed mechanism 208) of an associated additive manufacturing system (e.g., system 200 herein) may be positioned upstream of delivery guide 202, and thus out of the way of delivery guide 202 to operatively move relative to print path 216.

In some applications, (block 306) pushing feedstock line 100 through delivery guide 202 may only initially be performed during a manufacturing operation, and subsequent to continuous flexible line 102 initially being deposited and secured relative to print path 216, the movement of delivery guide 202 relative to print path 216 may operate to pull feedstock line 100, and thus continuous flexible line 102, through delivery guide 202 without the need to continuously and operatively push feedstock line 100 through delivery guide 202. In other applications, (block 306) pushing feedstock line 100 through delivery guide 202 may be performed during an entirety of manufacturing of object 108. In yet other applications, block (306) pushing feedstock line 100 through delivery guide 202 may be performed intermittently during manufacturing of object 108, while at other times feedstock line 100 is pulled through delivery guide 202 simply due to continuous flexible line 102 being secured relative to print path 216 and the movement of delivery guide 202 relative to print path 216. In yet other applications, (block 306) pushing feedstock line 100 through delivery guide 202 may only initially or intermittently be performed, while at other times feedstock line 100 is pulled through delivery guide 202 as a result of (block 304) removing covering 106 from peripheral surface 104 of continuous flexible line 102.

Referring generally to FIGS. 2, 15, and 16 and particularly to, e.g., FIG. 26, according to method 300, (block 306) pushing feedstock line 100 is performed by opposing feed-rollers 210 that engage opposite sides of feedstock line 100 and selectively rotate to push feedstock line 100 through delivery guide 202. The preceding subject matter of this paragraph characterizes example 65 of the present disclosure, wherein example 65 also includes the subject matter according to example 64, above.

Opposing feed-rollers 210, when selectively rotated, act to frictionally engage feedstock line 100, thereby feeding it between opposing feed-rollers 210 and pushing it into and through delivery guide 202.

Referring generally to FIGS. 2, 19, and 20 and particularly to, e.g., FIG. 26, according to method 300, opposing feed-rollers 210 have feedstock-line engagement surfaces 212 that are geometrically complementary to feedstock line 100. The preceding subject matter of this paragraph characterizes example 66 of the present disclosure, wherein example 66 also includes the subject matter according to example 65, above.

By feedstock-line engagement surfaces 212 being geometrically complementary to feedstock line 100, opposing feed-rollers 210 may frictionally engage a significant portion of an outer surface of feedstock line 100 for operative advancement through delivery guide 202. Moreover, the integrity (e.g., the cross-sectional shape) of feedstock line 100 and thus continuous flexible line 102 may be maintained despite the frictional engagement of feedstock line 100 by feedstock-line engagement surfaces 212.

Referring generally to FIGS. 1, 2, 6, 7, 11-13, 19, and 20 and particularly to, e.g., FIG. 26, according to method 300, covering 106 comprises at least one flange 116, extending away from continuous flexible line 102 along all of the length of feedstock line 100. Opposing feed-rollers 210 have feedstock-line engagement surfaces 212, shaped to engage at least one flange 116. The preceding subject matter of this paragraph characterizes example 67 of the present disclosure, wherein example 67 also includes the subject matter according to example 65 or 66, above.

Feedstock-line engagement surfaces 212 that are shaped to engage flange 116 serve to geometrically complement feedstock line 100, provide a suitable frictional engagement between flange 116 and feedstock-line engagement surfaces 212, and maintain the integrity of feedstock line 100 and thus continuous flexible line 102 as feedstock line 100 is being advanced through delivery guide 202.

Referring generally to FIGS. 1, 2, 6, 7, 11-14, and 19 and particularly to, e.g., FIG. 26, according to method 300, covering 106 comprises at least one flange 116, extending away from continuous flexible line 102 along all of the length of feedstock line 100. At least one flange 116 comprises depressions 118 or holes 120, spaced along all of the length of feedstock line 100. Opposing feed-rollers 210 engage depressions 118 or holes 120 to drive feedstock line 100 through delivery guide 202. The preceding subject matter of this paragraph characterizes example 68 of the present disclosure, wherein example 68 also includes the subject matter according to any one of examples 65 to 67, above.

Inclusion of, and engagement between, depressions 118 or holes 120 of flange 116 and opposing feed-rollers 210 permits precise advancement of feedstock line 100 through delivery guide 202.

Referring generally to FIGS. 2 and 18 and particularly to, e.g., FIG. 26, according to method 300, delivery guide 202 comprises internal passage 214, through which feedstock line 100 passes. Internal passage 214 has a cross-sectional shape that is geometrically complementary to a cross-sectional shape of feedstock line 100. The preceding subject matter of this paragraph characterizes example 69 of the present disclosure, wherein example 69 also includes the subject matter according to any one of examples 48 to 68, above.

By internal passage 214 of delivery guide 202 having a cross-sectional shape that corresponds to the cross-sectional shape of feedstock line 100, clearance between feedstock line 100 and internal passage 214 may be minimized. Accordingly, feedstock line 100 may be less susceptible to kinking, bunching, or otherwise deforming within internal passage 214 as it is advanced through delivery guide 202.

Referring generally to FIGS. 2, 24, and 25 and particularly to, e.g., FIG. 26, according to method 300, delivery guide 202 comprises delivery-guide roller 220. Delivery-guide roller 220 is selectively rotated to advance feedstock line 100 toward print path 216. The preceding subject matter of this paragraph characterizes example 70 of the present disclosure, wherein example 70 also includes the subject matter according to any one of examples 48 to 69, above.

Inclusion of delivery-guide roller 220 may avoid the need for a separate feed mechanism (e.g., feed mechanism 208 of system 200), resulting in a less complex and less expensive manufacturing system (e.g., system 200).

Referring generally to FIGS. 15-17, 22, and 24 and particularly to, e.g., FIG. 26, according to method 300, (block 304) removing covering 106 comprises (block 308) pulling covering 106 away from delivery guide 202. The preceding subject matter of this paragraph characterizes example 71 of the present disclosure, wherein example 71 also includes the subject matter according to any one of examples 48 to 70, above.

Pulling covering 106 away from delivery guide 202 serves to remove covering 106 from peripheral surface 104 of continuous flexible line 102, so that continuous flexible line 102 may be deposited to additively manufacture object 108. In addition, pulling covering 106 away from delivery guide 202 provides clearance between delivery guide 202 and print path 216 for operative and precise movement of delivery guide 202 relative to print path 216.

Referring generally to FIGS. 17, 22, and 24 and particularly to, e.g., FIG. 26, according to method 300, (block 308) pulling covering 106 away from delivery guide 202 results in (block 302) feeding feedstock line 100. The preceding subject matter of this paragraph characterizes example 72 of the present disclosure, wherein example 72 also includes the subject matter according to example 71, above.

When pulling covering 106 away from delivery guide 202 results in feeding feedstock line 100, a separate mechanism (e.g., feed mechanism 208 of system 200) is not required to push feedstock line through delivery guide 202.

Referring generally to FIGS. 2, 16-17, 21, 22, and 24 and particularly to, e.g., FIG. 26, according to method 300, (block 304) removing covering 106 is performed by opposing covering rollers 224 that engage opposite sides of covering 106 and that are selectively rotated to pull covering 106 away from delivery guide 202. The preceding subject matter of this paragraph characterizes example 73 of the present disclosure, wherein example 73 also includes the subject matter according to any one of examples 48 to 72, above.

Opposing covering rollers 224, when selectively rotated, act to frictionally engage covering 106, or member 112 thereof, thereby feeding it between opposing covering rollers 224 and pulling it away from delivery guide 202.

Referring generally to FIGS. 1, 2, 6, 7, 11-14, and 21 and particularly to, e.g., FIG. 26, according to method 300, covering 106 comprises at least one flange 116, extending away from continuous flexible line 102 along all of the length of feedstock line 100. At least one flange 116 comprises depressions 118 or holes 120, spaced along all of the length of feedstock line 100. Opposing covering rollers 224 engage depressions 118 or holes 120 to drive covering 106 away from delivery guide 202. The preceding subject matter of this paragraph characterizes example 74 of the present disclosure, wherein example 74 also includes the subject matter according to example 73, above.

Inclusion of, and engagement between, depressions 118 or holes 120 of flange 116 and opposing covering rollers 224 permits for precise pulling of covering 106 away from delivery guide 202, for example, avoiding covering 106 bunching up adjacent to the outlet of delivery guide 202 and potentially interfering with deposition of continuous flexible line 102 along print path 216.

Referring generally to FIGS. 2, 24, and 25 and particularly to, e.g., FIG. 26, according to method 300, delivery guide 202 comprises delivery-guide roller 220. Feeding feedstock line 100 comprises (block 310) rotating delivery-guide roller 220. The preceding subject matter of this paragraph characterizes example 75 of the present disclosure, wherein example 75 also includes the subject matter according to any one of examples 48 to 74, above.

Inclusion of delivery-guide roller 220 may avoid the need for a separate feed mechanism (e.g., feed mechanism 208 of system 200), resulting in a less complex and less expensive manufacturing system (e.g., system 200).

Examples of the present disclosure may be described in the context of aircraft manufacturing and service method 1100 as shown in FIG. 27 and aircraft 1102 as shown in FIG. 28. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 28, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A method of additively manufacturing an object, the method comprising:
feeding a feedstock line that has a length and comprises a continuous flexible line, having a peripheral surface, and that further comprises a covering, releasably coupled to the peripheral surface of the continuous flexible line, into a delivery guide;
removing the covering from the peripheral surface of the continuous flexible line before the continuous flexible line is deposited along a print path; and
depositing the continuous flexible line along the print path using the delivery guide.

2. The method according to claim 1, wherein the covering fully and circumferentially encloses the peripheral surface of the continuous flexible line.

3. The method according to claim 1, wherein the peripheral surface of the continuous flexible line comprises at least one region, not covered by the covering and extending along all of the length of the feedstock line.

4. The method according to claim 3, wherein at least the region of the peripheral surface of the continuous flexible line comprises two regions, circumferentially spaced apart from each other around the continuous flexible line.

5. The method according to claim 1, wherein the covering comprises at least one member , extending along all of the length of the feedstock line.

6. The method according to claim 5, wherein at least the one member of the covering is a single member.

7. The method according to claim 6, wherein the single member of the covering overlaps itself along all of the length of the feedstock line.

8. The method according to claim 5, wherein:
at least the one member of the covering comprises a plurality of members; and
members of at least a subset of the plurality of members overlap each other along all of the length of the feedstock line.

9. The method according to claim 1, wherein:
the covering comprises at least one member, extending along all of the length of the feedstock line; and
the covering comprises at least one flange, extending away from the continuous flexible line along all of the length of the feedstock line.

10. The method according to claim 9, wherein at least the one flange is a single flange.

11. The method according to claim 9, wherein at least the one flange comprises two opposed flanges.

12. The method according to claim 1, wherein the covering comprises a notch, extending along all of the length of the feedstock line.

13. The method according to claim 1, wherein feeding the feedstock line comprises pushing the feedstock line through the delivery guide.

14. The method according to claim 13, wherein pushing the feedstock line is performed by opposing feed-rollers that engage opposite sides of the feedstock line and selectively rotate to push the feedstock line through the delivery guide.

15. The method according to claim 14, wherein the opposing feed-rollers have feedstock-line engagement surfaces that are geometrically complementary to the feedstock line.

16. The method according to claim 14, wherein:
the covering comprises at least one flange, extending away from the continuous flexible line along all of the length of the feedstock line; and
the opposing feed-rollers have feedstock-line engagement surfaces, shaped to engage at least the one flange.

17. The method according to claim 14, wherein:
the covering comprises at least one flange, extending away from the continuous flexible line along all of the length of the feedstock line;
at least the one flange comprises depressions or holes, spaced along all of the length of the feedstock line; and
the opposing feed-rollers engage the depressions or the holes to drive the feedstock line through the delivery guide.

18. The method according to claim 1, wherein:
the delivery guide comprises an internal passage, through which the feedstock line passes; and
the internal passage has a cross-sectional shape that is geometrically complementary to a cross-sectional shape of the feedstock line.

19. The method according to claim 1, wherein:
the delivery guide comprises a delivery-guide roller; and
the delivery-guide roller is selectively rotated to advance the feedstock line toward the print path.

20. The method according to claim 1, wherein removing the covering comprises pulling the covering away from the delivery guide.

* * * * *